(12) United States Patent
Hill et al.

(10) Patent No.: US 7,411,584 B2
(45) Date of Patent: Aug. 12, 2008

(54) TOUCH SENSITIVE DEVICE EMPLOYING BENDING WAVE VIBRATION SENSING AND EXCITATION TRANSDUCERS

(75) Inventors: Nicholas P. R. Hill, Cambridge (GB); Darius M. Sullivan, Cambridge (GB)

(73) Assignee: 3M Innovative Properties Company, Saint Paul, MN (US)

( * ) Notice: Subject to any disclaimer, the term of this patent is extended or adjusted under 35 U.S.C. 154(b) by 550 days.

(21) Appl. No.: 10/750,502

(22) Filed: Dec. 31, 2003

(65) Prior Publication Data

US 2005/0146513 A1 Jul. 7, 2005

(51) Int. Cl.
 G09G 5/00 (2006.01)
(52) U.S. Cl. ............... 345/177; 345/156; 345/160; 345/169; 345/173; 178/18.01; 178/18.03; 178/18.04
(58) Field of Classification Search ......... 345/173–177, 345/156, 160, 169; 702/56; 178/18.04, 18.05, 178/18.06, 18.07
See application file for complete search history.

(56) References Cited

U.S. PATENT DOCUMENTS

| 5,394,003 | A | * | 2/1995 | Bales et al. .............. 257/416 |
| 5,637,839 | A | | 6/1997 | Yamaguchi et al. |
| 5,784,054 | A | | 7/1998 | Armstrong et al. |
| 6,285,719 | B1 | * | 9/2001 | Sobel ..................... 375/259 |
| 2001/0006006 | A1 | * | 7/2001 | Hill ....................... 73/606 |
| 2003/0217873 | A1 | | 11/2003 | Paradiso et al. |

FOREIGN PATENT DOCUMENTS

| JP | 11353104 | 12/1999 |
| WO | WO 01/48684 | 7/2001 |
| WO | WO 03/005292 | 1/2003 |

OTHER PUBLICATIONS

U.S. Appl. No. 09/746,405, filed Dec. 26, 2000, Contact Sensitive Device.
U.S. Appl. No. 60/432,024, filed Dec. 10, 2002, Contact Sensitive Device.
U.S. Appl. No. 10/440,650, filed May 19, 2003, Vibration Sensing Touch Input Device.
U.S. Appl. No. 10/683,342, filed Oct. 10, 2003, Wake-On-Touch for Vibration Sensing Touch Input Devices.
U.S. Appl. No. 10/750,291, filed Dec. 31, 2003, Touch Sensing With Touch Down and Lift Off Sensitivity.

* cited by examiner

*Primary Examiner*—Richard Hjerpe
*Assistant Examiner*—Jennifer T Nguyen

(57) ABSTRACT

A touch sensitive apparatus includes a touch plate to which several pickup sensors and at least one excitation transducer are coupled. Each of the sensors is configured to sense bending waves in the touch plate, and the excitation transducer is configured to induce bending waves in the touch plate. The apparatus may further include active buffer circuits, wherein each of the active buffer circuits is coupled to one of the sensors. A controller is coupled to the sensors via the active buffer circuits and to the excitation transducer via a non-actively buffered connection. The controller is configured to compute a location of a contact on the touch plate responsive to sense signals received from the sensors. The apparatus may be used to perform a variety of calibrations, including touch plate and sensor calibrations. Changes in touch sensing apparatus calibration and performance may be detected and tracked over time.

28 Claims, 19 Drawing Sheets

TOUCH SENSITIVE DEVICE EMPLOYING BENDING WAVE VIBRATION SENSING AND EXCITATION TRANSDUCERS

FIELD OF THE INVENTION

The present invention relates to touch sensitive devices and, more particularly, to vibration sensing touch sensitive devices that employ a number of pickup sensors and at least one excitation transducer.

BACKGROUND

Interactive visual displays often include some form of touch sensitive screen. Integrating touch sensitive panels with visual displays is becoming more common with the emergence of next generation portable multimedia devices. One popular touch detection technology, referred to as Surface Acoustic Wave (SAW), uses high frequency waves propagating on the surface of a glass screen. Attenuation of the waves resulting from contact of a finger with the glass screen surface is used to detect touch location. SAW employs a "time-of-flight" technique, where the time for the disturbance to reach the pickup sensors is used to detect the touch location. Such an approach is possible when the medium behaves in a non-dispersive manner, such that the velocity of the waves does not vary significantly over the frequency range of interest.

SUMMARY OF THE INVENTION

The present invention is directed to a touch sensitive apparatus that is generally capable of sensing bending wave vibrations in a touch sensitive plate. Embodiments of the present invention includes those that employ pickup sensors and at least one excitation transducer. According to one embodiment, a touch sensitive apparatus includes a touch plate to which several pickup sensors and at least one excitation transducer are respectively coupled. Each of the sensors is configured to sense bending waves in the touch plate, and the excitation transducer is configured to induce bending waves in the touch plate. The apparatus further includes active buffer circuits, wherein each of the active buffer circuits is coupled to one of the sensors. A controller is coupled to the sensors via the active buffer circuits and to the excitation transducer via a non-actively buffered connection. The controller is configured to compute a location of a contact on the touch plate responsive to sense signals received from the sensors.

A touch sensitive apparatus employing pickup sensors and at least one excitation transducer may perform a variety of calibrations, including touch plate and sensor calibrations. For example, plate calibration may be used to provide useful information concerning the touch substrate, such as relative or absolute plate dimensions. Pickup sensor calibration may, for example, be used to determine differences in sensor phase response, and corrections may be made to the measured bending wave signals to accommodate such differences in sensor phase response. Changes in touch sensing apparatus calibration and performance may be detected and tracked over time.

According to another embodiment, a method for use with a touch sensitive device involves applying an excitation signal generated by an excitation transducer to a touch plate and sensing the excitation signal by each of a number of sensors. A transfer function of an input at the excitation transducer to an output at each of the sensors is determined. A dispersion corrected impulse response is determined for each of the sensors using the transfer function. A calibration of the touch sensitive device is performed using the respective dispersion corrected impulse responses. Useful calibrations include determining relative or absolute dimensions of the touch plate and determining a phase or amplitude response of each of the sensors. Phase or amplitude response differences between the sensors may be corrected when performing touch location detection. Another useful calibration involves determining a dispersion relation for the touch plate.

In accordance with a further embodiment, a method for use with a touch sensitive device involves applying an excitation signal generated by an excitation transducer to a touch plate and sensing the excitation signal by each of a number of sensors. A transfer function of an input at the excitation transducer to an output at each of the sensors is determined. According to this embodiment, a dispersion corrected impulse response for each of the sensors is not used. The method further involves measuring a phase component of a frequency response associated with the excitation signal sensed by each of the sensors, and performing a calibration of the touch plate using the measured phase components. Measuring the phase component of the frequency response may involve mechanically or algorithmically enhancing detection of a first arrival of energy of the excitation signal by each of the sensors.

Calibrating the touch plate according to this embodiment may involve calculating a phase ratio of total phase response to measured phase component for each of the sensors, and calculating an aspect ratio of the touch plate using the phase ratio. Another touch plate calibration approach involves calculating a total phase response of first arrival energy for each of the sensors, differentiating phase of the total phase response with respect to frequency, characterizing a phase velocity as a function of frequency, and determining a dispersion relation of the touch plate using the phase velocity characterization.

According to another embodiment, time of arrival is used in connection with touch plate calibration. According to one approach, a calibration method involves applying an excitation signal generated by the excitation transducer to a touch plate, sensing the excitation signal by each of several sensors, and determining a transfer function of an input at the excitation transducer to an output at each of the sensors. The method further involves calculating, in the time domain, an impulse response for each of the sensors using the transfer function, and measuring time of first energy arrival to each of the sensors. A distance from the excitation transducer to each of the sensors is calculated using the measured times of first energy arrival. Dimensions of the touch plate are calculated using the calculated transducer-to-sensor distances. This method may further involve filtering the impulse response into one or more frequency bands, averaging the calculated distances for each of the frequency bands, and calculating dimensions of the touch plate using the averaged transducer-to-sensor distances.

The above summary of the present invention is not intended to describe each embodiment or every implementation of the present invention. Advantages and attainments, together with a more complete understanding of the invention, will become apparent and appreciated by referring to the following detailed description and claims taken in conjunction with the accompanying drawings.

BRIEF DESCRIPTION OF THE DRAWINGS

FIG. 1b graphically shows the frequency response of the dispersive impulse response of FIG. 1a obtained by taking the Fourier Transform of the impulse response of FIG. 1a;

Figure 1A:
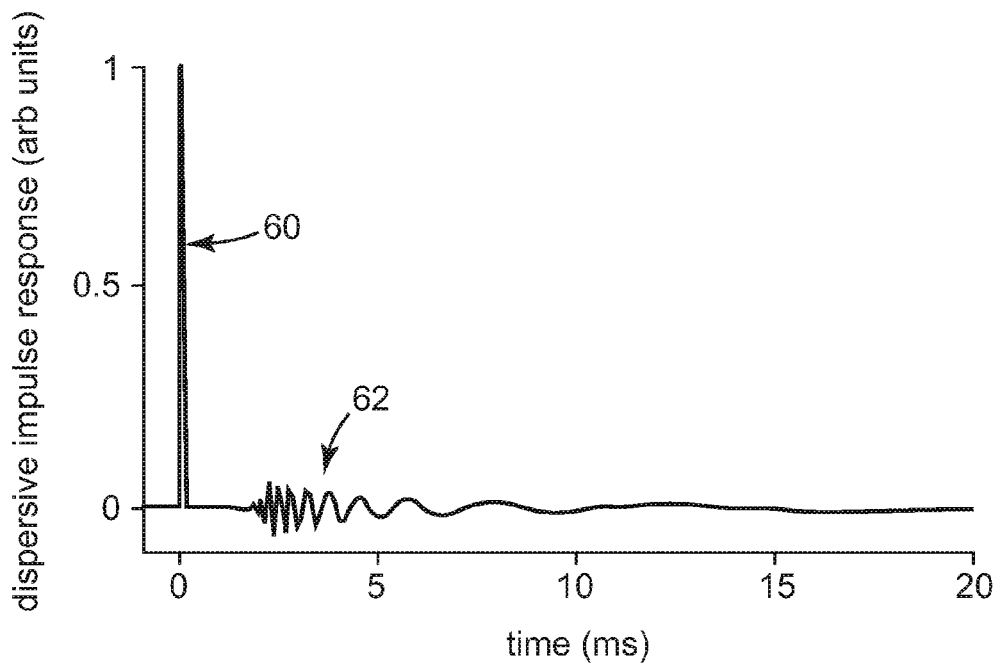
FIG. 1a graphically shows an impulse response in an ideal medium with a square root dispersion relation.

While the invention is amenable to various modifications and alternative forms, specifics thereof have been shown by way of example in the drawings and will be described in detail. It is to be understood, however, that the intention is not to limit the invention to the particular embodiments described. On the contrary, the intention is to cover all modifications, equivalents, and alternatives falling within the scope of the invention as defined by the appended claims.

DETAILED DESCRIPTION OF VARIOUS EMBODIMENTS

In the following description of the illustrated embodiments, reference is made to the accompanying drawings which form a part hereof, and in which is shown by way of illustration, various embodiments in which the invention may be practiced. It is to be understood that the embodiments may be utilized and structural changes may be made without departing from the scope of the present invention.

The present invention relates to touch activated, user interactive devices that sense vibrations that propagate through a touch substrate for sensing by a number of touch transducers. More particularly, the present invention relates to a bending wave vibration touch sensing apparatus that, in addition to employing pickup sensors, includes at least one excitation transducer. Cooperative use of the pickup sensors and excitation transducer provides for a number of enhanced operational and diagnostic capabilities. Such capabilities include, for example, performing a plate calibration procedure that provides useful information concerning the touch substrate, such as relative or absolute plate dimensions. Another capability is directed to pickup sensor calibration, in which differences in sensor phase response are determined, and corrections are made to the measured bending wave signals to accommodate such differences in sensor phase response.

A further capability realizable through cooperative use of pickup sensors and an excitation transducer of a touch sensing apparatus concerns detection of changes in touch sensing apparatus performance and tracking changes in same over time. Subtle and dramatic changes in touch sensing apparatus performance may be detected and tracked. Information concerning touch sensing apparatus status and performance changes may be stored locally and/or accessed by a remote system. A number of self-diagnostic processes may be implemented to correct for less severe changes in performance (locally and/or remotely), and maintenance information/warning messages may be generated in response to detection of significant changes in touch sensing apparatus performance. Other capabilities include enhanced lift-off detection, improved sensitivity to light touches, and improved wake-on-touch functionality.

These and other advantageous features and capabilities are described below in greater detail. A touch sensing apparatus implemented in accordance with the present invention may incorporate one or more of the features, structures, methods, or combinations thereof described herein. It is intended that such a device or method need not include all of the features and functions described herein, but may be implemented to include selected features and functions that, in combination, provide for unique structures and/or functionality.

In vibration sensing touch input devices that include piezoelectric sensors, for example, vibrations propagating in the plane of the touch panel plate stress the piezoelectric sensors, causing a detectable voltage drop across the sensor. The signal received can be caused by a vibration resulting directly from the impact of a direct touch input or the input of energy with a trace (friction), or by a touch input influencing an existing vibration, for example by attenuation of the vibration. The signal received can also be caused by an unintended touch input, such as a touch input resulting from user handling or mishandling of the touch input device, or from environmental sources external to, but sensed by, the touch input device.

According to one touch sensing approach, upon receiving a signal indicative of a direct touch, for example, the differential times at which the same signal is received at each of the sensors can be used to deduce the location of the touch input. When the propagation medium is a dispersive medium, the vibration wave packet, which is composed of multiple frequencies, becomes spread out and attenuated as it propagates, making interpretation of the signal difficult. As such, it has been proposed to convert the received signals so they can be interpreted as if they were propagated in a non-dispersive medium. Such a technique is particularly suited to systems that detect bending wave vibrations.

Techniques for addressing vibration wave packet dispersion and producing representative signals corrected for such dispersion are disclosed in International Publications WO 2003/005292 and WO 01/48684; U.S. patent application Ser. No. 09/746,405 filed Dec. 26, 2000; U.S. Provisional Application 60/432,024 filed Dec. 10, 2002; and in commonly owned U.S. patent application Ser. No. 10/440,650, each of which is incorporated herein by reference.

The term bending wave vibration refers to an excitation, for example by the contact, which imparts some out of plane displacement to a member capable to supporting bending wave vibrations. Many materials bend, some with pure bending with a perfect square root dispersion relation and some with a mixture of pure and shear bending. The dispersion relation describes the dependence of the in-plane velocity of the waves on the frequency of the waves.

For purposes of enhancing an understanding of vibration wave packet dispersion and producing representative signals corrected for such dispersion, reference is made to FIGS. 1a-1d. FIG. 1a shows an impulse in an ideal medium with a square root dispersion relation and demonstrates that a dispersive medium does not preserve the waveshape of an impulse. The outgoing wave 60 is evident at time t=0 and the echo signal 62 is spread out over time, which makes a determination of an exact contact position problematic.

In a non-dispersive medium such as air, a periodic variation of the frequency response is characteristic of a reflection, and is often referred to as comb filtering. Physically, the periodic variation in the frequency response derives from the number of wavelengths that fit between the source and the reflector. As the frequency is increased and the number of wavelengths fitting in this space increases, the interference of the reflected wave with the outgoing wave oscillates between constructive and destructive.

Figure 1B:
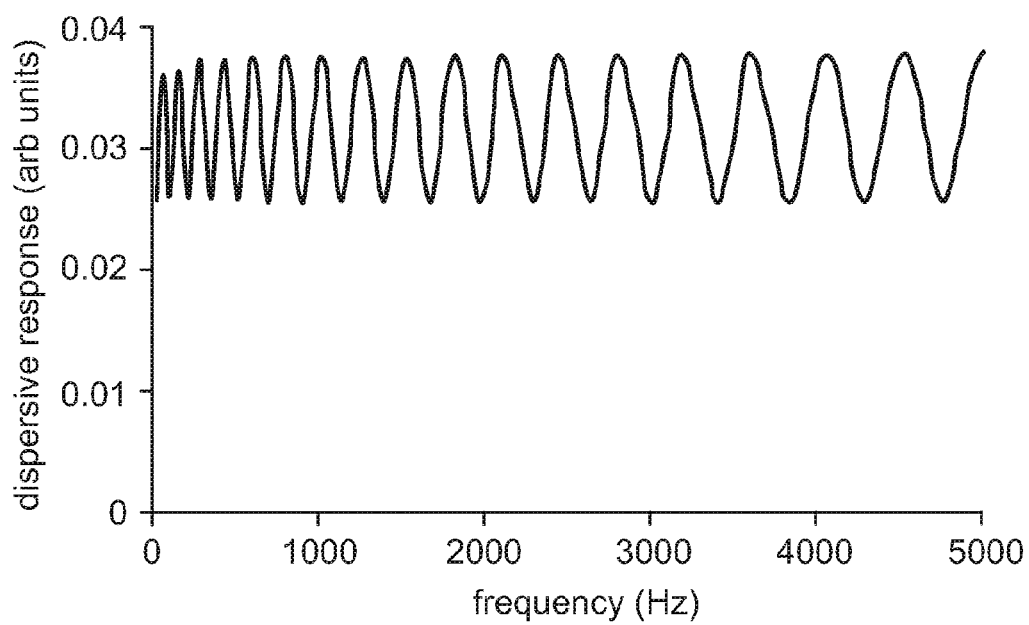

Calculating the Fourier transform of the dispersive impulse response of FIG. 1a produces the frequency response shown in FIG. 1b. The frequency response is non-periodic and the periodic variation with wavelength translates to a variation in frequency that gets slower with increasing frequency. This is a consequence of the square root dispersion in which the wavelength is proportional to the square root of the inverse of frequency. The effect of the panel on the frequency response is therefore to stretch the response as a function of frequency according to the panel dispersion. Consequently, a correction for the panel dispersion may be applied by applying the inverse stretch in the frequency domain, thus restoring the periodicity present in the non-dispersive case.

By warping the frequency axis with the inverse of the panel dispersion, FIG. 1b may be transformed into the frequency response for the non-dispersive case (FIG. 1c) in which the frequency of excitation is proportional to the inverse of the wavelength. This simple relationship translates the periodic variation with decreasing wavelength to a periodic variation with increasing frequency as shown in FIG. 1c.

Figure 1C:
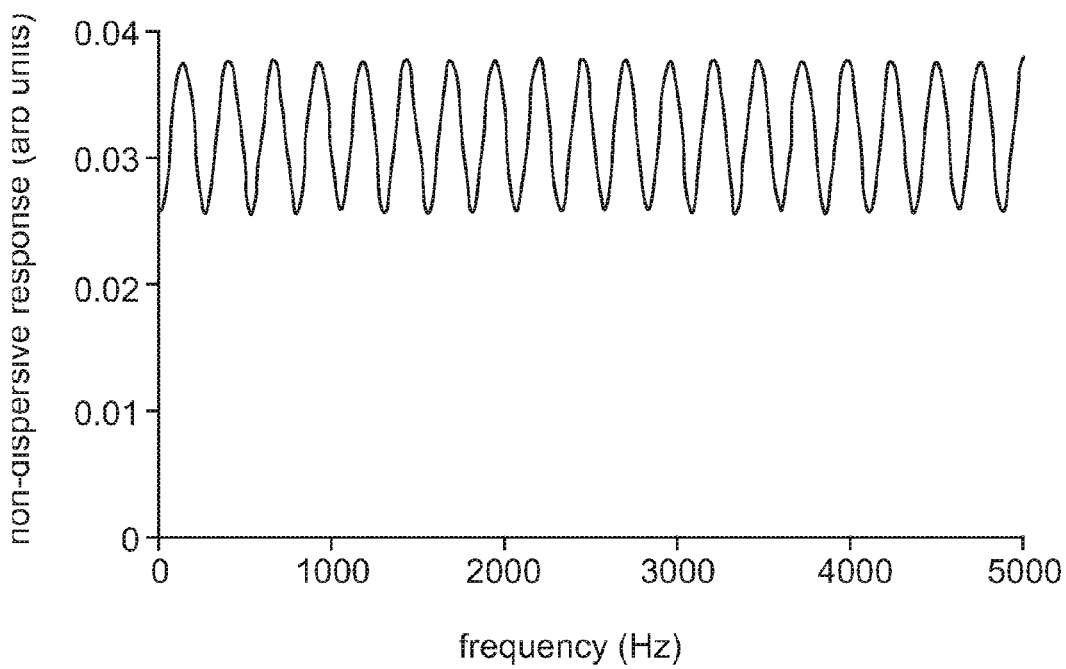
FIG. 1c graphically shows a dispersion corrected transformation of the dispersive frequency response shown in FIG. 1b obtained by warping the frequency axis with the inverse of the touch panel dispersion.
Figure 1D:
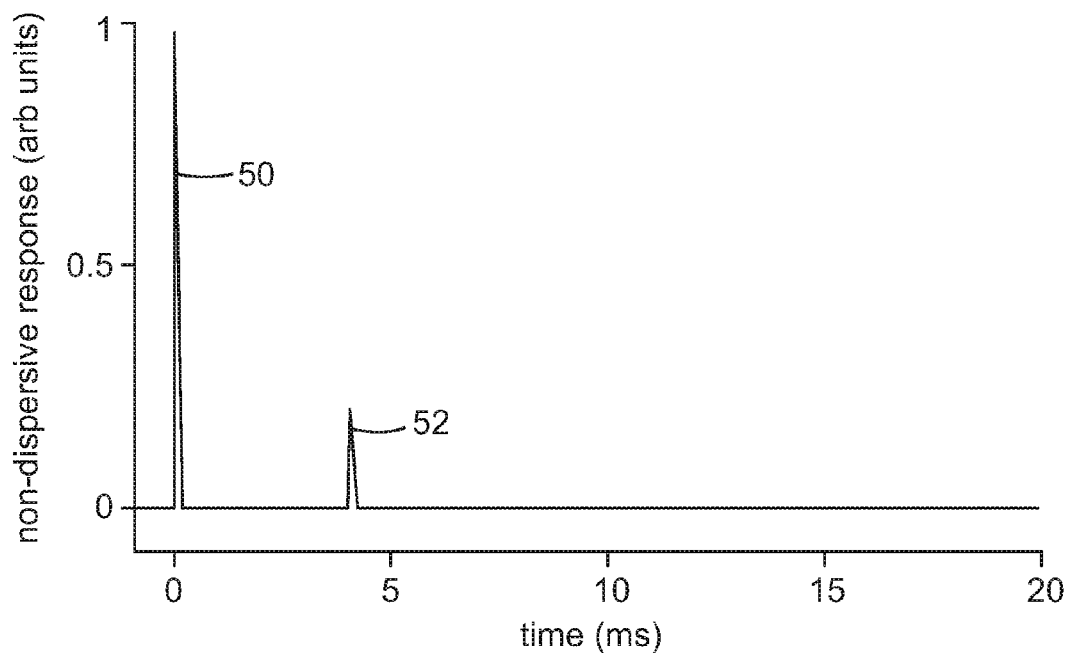
FIG. 1d shows a non-dispersive impulse response produced by applying the inverse Fast Fourier Transform (FFT) to the trace of FIG. 1c, which has been corrected for dispersion.

Applying the inverse Fast Fourier Transform (FFT) to the trace of FIG. 1c produces an impulse response shown in FIG. 1d, which is corrected for dispersion and where the clear reflection is restored. As is shown in FIG. 1d, any particular waveshape of an impulse is preserved in time since the waves travelling in a non-dispersive medium have a constant velocity of travel, independent of their frequency. Accordingly, the task of echo location is relatively straight forward. The outgoing wave 50 is evident at time t=0, together with a clear reflection 52 at 4 ms. The reflection 52 has a magnitude which is approximately one-quarter of the magnitude of the outgoing wave 50.

It is noted that the procedure described above is not applicable if the impulse has occurred at an unknown time $t_0$ and the distance x from the response to an initial impulse may only be calculated if the impulse occurs at $t_0=0$. A dispersion corrected correlation function may be employed in situations where the precise time, $t_0$, at which a contact occurred is not known. According to one approach, a first sensor mounted on a structure capable of supporting bending waves measures a first measured bending wave signal. A second sensor is mounted on the structure to determine a second measured bending wave signal. The second measured bending wave signal is measured simultaneously with the first measured bending wave signal. A dispersion corrected function of the two measured bending wave signals is calculated, which may be a dispersion corrected correlation function, a dispersion corrected convolution function, a dispersion corrected coherence function or other phase equivalent function. The measured bending wave signals are processed to calculate information relating to the contact by applying the dispersion corrected function. Details concerning this approach are disclosed in previously incorporated PCT application 01/48684 and U.S. patent application Ser. No. 09/746,405.

Figure 2:
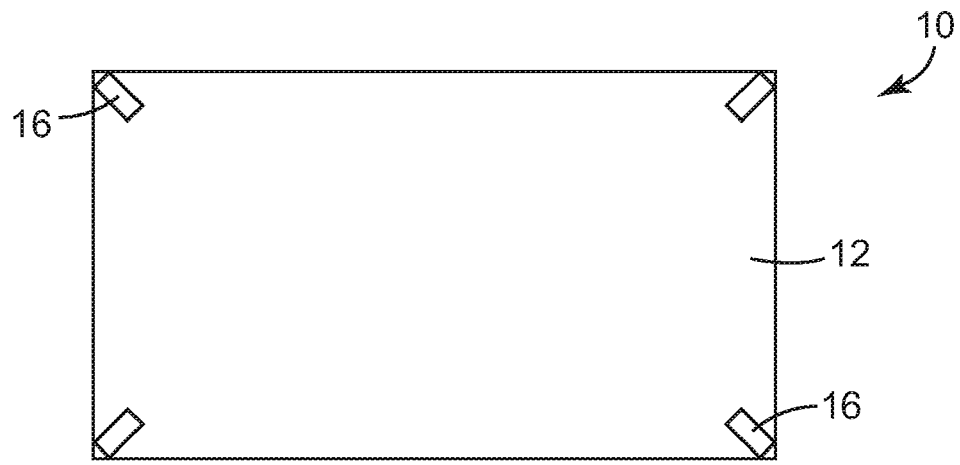
FIG. 2 illustrates one configuration of a touch sensitive device that incorporates features and functionality for detecting bending wave vibrations in accordance with an embodiment of the present invention.

Turning now to FIG. 2, there is illustrated one configuration of a touch sensitive device 10 that incorporates features and functionality for detecting bending wave vibrations. According to this embodiment, the touch sensitive device 10 includes a touch substrate 12 and vibration sensors 16 coupled to an upper surface of the touch substrate 12. In this illustrative example, the upper surface of the touch substrate 12 defines a touch sensitive surface. Although sensors 16 are shown coupled to the upper surface of the touch substrate 12, the sensors 16 can alternatively be coupled to the lower surface of the touch substrate 12. In another embodiment, one or more sensors 16 may be coupled to the upper surface while one or more other sensors 16 may be coupled to the lower surface of the touch substrate 12.

Touch substrate 12 may be any substrate that supports vibrations of interest, such as bending wave vibrations. Exemplary substrates 12 include plastics such as acrylics or polycarbonates, glass, or other suitable materials. Touch substrate 12 can be transparent or opaque, and can optionally include or incorporate other layers or support additional functionalities. For example, touch substrate 12 can provide scratch resistance, smudge resistance, glare reduction, anti-reflection properties, light control for directionality or privacy, filtering, polarization, optical compensation, frictional texturing, coloration, graphical images, and the like.

In general, the touch sensitive device 10 includes at least three sensors 16 to determine the position of a touch input in two dimensions, and four sensors 16 may be desirable in some embodiments, as discussed in International Publications WO 2003 005292 and WO 0148684, and in U.S. patent application Ser. No. 09/746,405. In the present invention, sensors 16 are preferably piezoelectric sensors that can sense vibrations indicative of a touch input to touch substrate 12. Useful piezoelectric sensors include unimorph and bimorph piezoelectric sensors. Piezoelectric sensors offer a number of advantageous features, including, for example, good sensitivity, relative low cost, adequate robustness, potentially small form factor, adequate stability, and linearity of response. Other sensors that can be used in vibration sensing touch sensitive devices 10 include electrostrictive, magnetostrictive, piezoresistive, acoustic, and moving coil transducers/devices, among others.

In one embodiment, all of the sensors 16 are configured to sense vibrations in the touch substrate 12. In another embodiment, one or more of the sensors 16 can be used as an emitter device to emit a signal that can be sensed by the other sensors 16 to be used as a reference signal or to create vibrations that can be altered under a touch input, such altered vibrations being sensed by the sensors 16 to determine the position of the touch. An electrodynamic transducer may be used as a suitable emitter device. Moreover, one or more of the sensors 16 can be configured as a dual purpose sense and excitation transducer. Sensors 16 can be affixed or bonded to touch substrate 12 by any suitable means, such as by use of an adhesive.

When the touch sensitive device 10 is operating with an active sensor 16, i.e. with an emitting transducer generating an excitation signal, a contact on the touch substrate 12 may exert a non-linear force on the touch substrate 12 so as to generate harmonics of the excitation signal. Signal processing may be used to isolate the excitation signal from the harmonics so that the harmonics may used to determine the contact position in a manner similar to passive sensing. The harmonics effectively constitute a source of bending waves from the contact site.

In a configuration in which the touch sensitive device 10 employs a dual active and passive sensor 16, this sensor 16 may be adapted to switch between active and passive sensing modes depending on whether contact is applied to the touch substrate 12. The touch sensitive device 10 may cycle between resting in passive sensing mode when no contact is detected, switching to active mode sensing when a contact is applied, and returning to passive sensing mode once the contact is removed to await further contacts. This may be advantageous to avoid power drain when the touch sensitive device 10 is unnecessarily in active mode.

Many applications that employ touch sensitive devices 10 also use electronic displays to display information through the touch sensitive devices 10. Since displays are typically rectangular, it is typical and convenient to use rectangular touch sensitive devices 10. As such, the touch substrate 12 to which the sensors 16 are affixed is typically rectangular in shape. Alternatively, the touch substrate 12 may have a more complex shape, for example a curved surface and/or variable thickness. In the case of touch substrate 12 having a complex shape, an adaptive algorithm (e.g., neural net) may be used to decipher the contact location from the bending wave signals received by the sensors 16.

According to one configuration, the sensors 16 are preferably placed near the corners of the touch substrate 12. Because many applications call for a display to be viewed through the touch sensitive devices 10, it is desirable to place the sensors near the edges of the touch substrate 12 so that they do not undesirably encroach on the viewable display area. Placement of the sensors 16 at the corners of a touch substrate 12 can also reduce the influence of reflections from the panel edges.

The contact sensed by the touch sensitive device 10 may be in the form of a touch from a stylus which may be in the form of a hand-held pen. The movement of a stylus on the touch substrate 12 may generate a continuous signal which is affected by the location, pressure and speed of the stylus on the touch substrate 12. The stylus may have a flexible tip, e.g. of rubber, which generates bending waves in the touch substrate 12 by applying a variable force thereto. The variable force may be provided by the tip, which alternatively adheres to or slips across a surface of the touch substrate 12. Alternatively, the contact may be in the form of a touch from a finger that may generate bending waves in the touch substrate 12, which may be detected by passive and/or active sensing. The bending waves may have frequency components in the ultrasonic region (>20 kHz).

Figure 3:
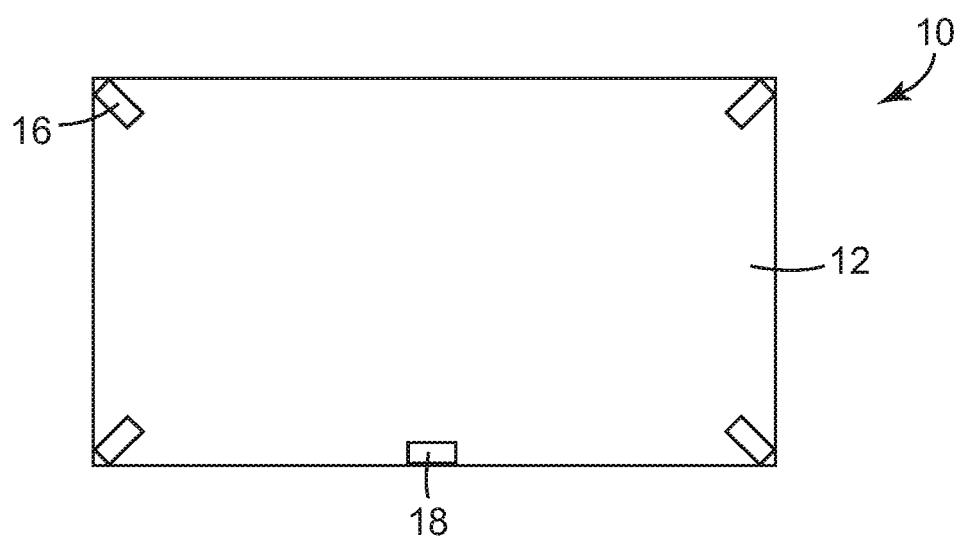
FIG. 3 illustrates another configuration of a touch sensitive device that incorporates pickup sensors and an excitation transducer in accordance with an embodiment of the present invention.

FIG. 3 illustrates another configuration of a touch sensitive device 10 in accordance with an embodiment of the present invention. According to this embodiment, the touch sensitive device 10 includes a number of sensors 16 for sensing bending wave vibrations in the touch substrate 12. The touch sensitive device 10 further includes an excitation transducer 18. The excitation transducer 18 is preferably a "dedicated" transducer 18, in that it is typically not used in normal touch location computations. Rather, normal touch location computations are made using pickup sensors 16. It is understood that excitation transducer 18 may be an emitting transducer or a dual emitter/sensor transducer. In a configuration in which excitation transducer 18 is configured as a dual emitter/sensor transducer, the dual mode transducer is typically not involved in normal touch location determination operations. Use of a dedicated excitation transducer 18 provides the opportunity to perform a variety of functions not readily possible using a conventional sensor/transducer topology.

In the configuration shown in FIG. 3, four sensors 16 are used as vibration pickups. These transducers 16 are preferably optimized for sensitivity to low levels of vibration associated with a light touch. Connection to these transducers 16 may be made with a printed electrode pattern. In addition to their operation as vibration pickups, when a voltage is applied to the sensors 16, energy is transferred into the plate, resulting in generation of bending waves. As such, a sensor 16 can, as discussed above, operate as both a vibration pickup sensor and a bending wave generator. However, the use of a given sensor 16 as a transducer for both vibration pickup and active excitation of the substrate 12 has a number of drawbacks.

One drawback is the inability of a single sensor 16 to operate as both a pickup and an emitter simultaneously. When the sensors 16 are being used as emitters driven by a stimulus, for example, they can not readily be used as simultaneous pickups. The functionality of the substrate 12 in pickup mode is therefore likely to either be impaired or only possible in a multiplexed fashion.

In a configuration that incorporates a buffer circuit between a given sensor 16 and associated sense circuitry, as will be discussed below, such a buffer circuit provides a barrier to the application of a voltage to the sensor 16 when operating as a pickup transducer. Although the buffer circuit may be placed in a reverse bias condition, in which case a voltage applied to the external connections to the substrate 12 is applied directly to the sensor 16, the voltage range over which this may be accomplished in a linear fashion is fairly limited. Also, this approach requires additional circuitry at the controller to which the touch sensitive device 10 is communicatively coupled.

To overcome these and other deficiencies associated with conventional touch sensitive device implementations, a transducer arrangement according to an embodiment of the present invention, and as shown in FIG. 3, incorporates at least one dedicated excitation transducer 18 that provides for active generation of bending waves in the substrate 12. Generation of bending waves may be used to provide for a number of performance improvements and diagnostic features, examples of which are described herein.

Figure 4:
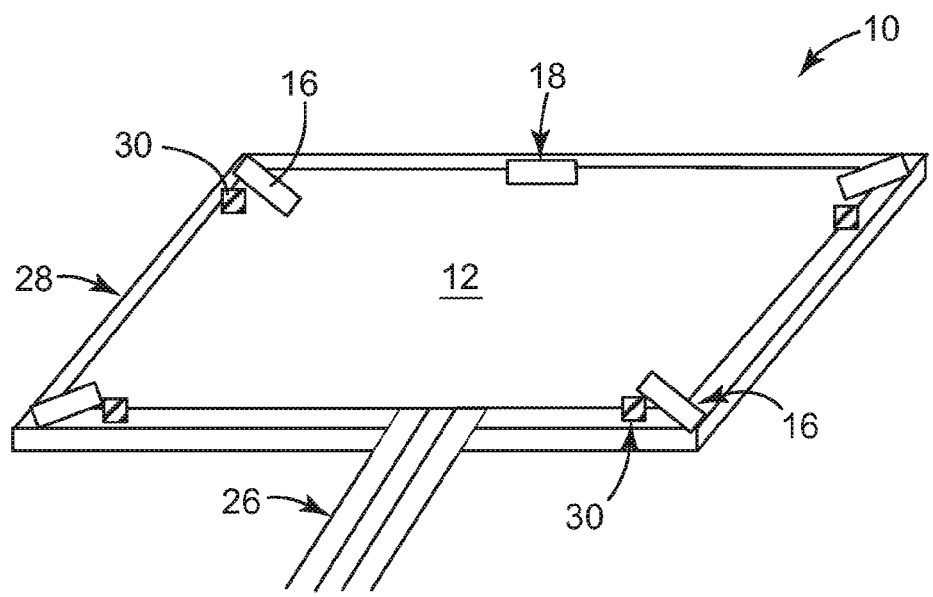
FIG. 4 shows a configuration of a touch sensitive device that incorporates an excitation transducer and pickup sensors coupled to buffer circuits in accordance with an embodiment of the present invention.

Turning now to FIG. 4, there is shown an embodiment of a touch sensitive device 10 in accordance with the present invention. In this embodiment, four sensors 16 are situated at the four corners of the substrate 12. A fifth transducer, an excitation transducer 18, is positioned along an edge of substrate 12 preferably equidistant between two adjacent sensors 16 situated proximate the same edge of the substrate 12. It will be appreciated that the excitation transducer 18 may be positioned at substrate locations other than that shown in FIG. 4. Each of the four sensors 16 and the excitation transducer 18 is connected to respective conductors that are routed to a tail connector 26. A printed electrode pattern may be used as the conductors, as noted above.

FIG. 4 further shows a buffer circuit 30 associated with each of the four corner sensors 16. A buffer circuit 30 may be situated on the substrate 12 adjacent to each sensor 16 to buffer the signals produced by the sensor 16 in response to sensed bending wave vibrations propagating in the substrate 12. Inclusion of the buffer circuits 30 provides several benefits, including increasing the signal to noise ratio of the sensors 16 and reducing the level of EMI interference from the environment. It is desirable that the buffer circuits 30 be situated in close proximity to the sensors 16, as shown in FIG. 4. However, the buffer circuits 30 may be situated elsewhere on the substrate 12 if desired, and may alternatively be integrated into the tail connector 26.

Figure 5:
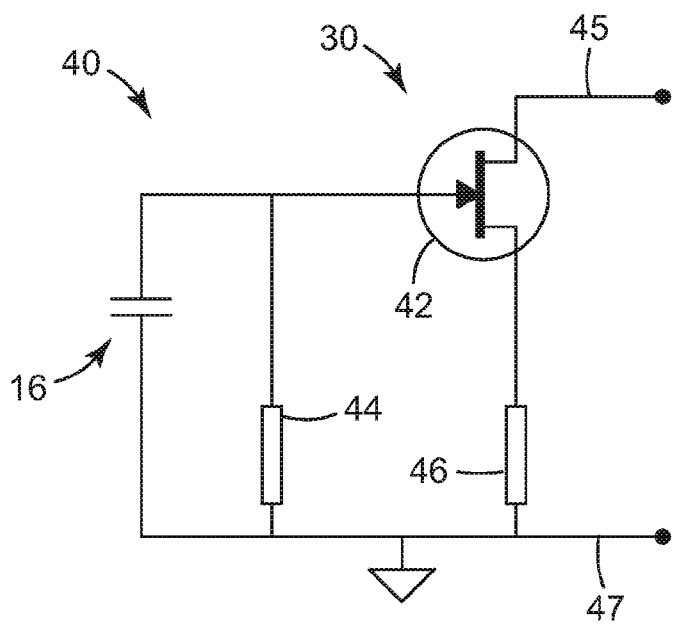
FIG. 5 is a schematic of a buffer circuit configuration suitable for use in the device embodiment shown in FIG. 4.

Each of the buffer circuits 30 includes an amplification circuit, such as that shown in FIG. 5. According to the simplified circuit configuration shown in FIG. 5, buffer circuit 30 includes a transistor 42, such as a field effect transistor (FET), having a base coupled in parallel to a pickup sensor 16 and a resistor 44. The drain of the FET 42, shown as an n-channel JFET (e.g., FET-J-N SST310), is coupled to a first conductor 45. The source of the FET 42 is coupled to a second conductor 47 via resistor 46. Conductors 45 and 47 are coupled to a controller of the touch sensitive device 10. It is noted that other components (not shown) are required off-substrate to properly bias the FET 42. Typical off-substrate components include a power supply, bias resistor, and a capacitive coupling to the analog input of the controller of the touch sensitive device 10.

In the configuration shown in FIG. 5, the pickup sensor 16 is wired such that it is referenced to ground. It will be appreciated that, in an alternative embodiment, the pickup sensor 16 may be wired to provide a differential input to a balanced amplifier, such as a balanced on-board amplifier (e.g., buffer circuit amplifier) or off-board amplifier (e.g., sense amplifier of a touch panel controller). According to this embodiment, each pickup sensor 16 is connected to a balanced input of an amplifier via two balanced wires. The balanced amplifier may be an on-board or off-board amplifier.

In one configuration, each pickup sensor 16 is connected to an off-board balanced amplifier via twisted pair conductors, and an on-board FET 42 need not be used. In another configuration, each pickup sensor 16 is connected to a balanced input of a FET 42 via two balanced wires, and a differential output of the FET 42 is connected to a balanced input of an off-board amplifier via twisted pair conductors. Use of balanced amplifiers according to this embodiment provides for differential pickup sensor voltage measurements. This configuration may provide for improved cancellation of certain sensor signal noise via common mode rejection afforded by differential pickup sensor voltage measurements.

For purposes of illustration, each of the sensors 16 shown in FIG. 4 is oriented approximately 45 degrees relative to the edges of the substrate 12. In addition, one buffer circuit 30 is mounted adjacent to each corner sensor 16. According to one touch sensitive device implementation, the substrate comprises a glass plate having length, width, and thickness dimensions of L=324 mm, W=246 mm, and T=2.2 mm, respectively. In each of the four corners of the substrate 12, a piezoelectric transducer 16 is situated having length, width, and thickness dimensions of L=7 mm, W=3 mm, and T=1 mm, respectively.

Figure 6:
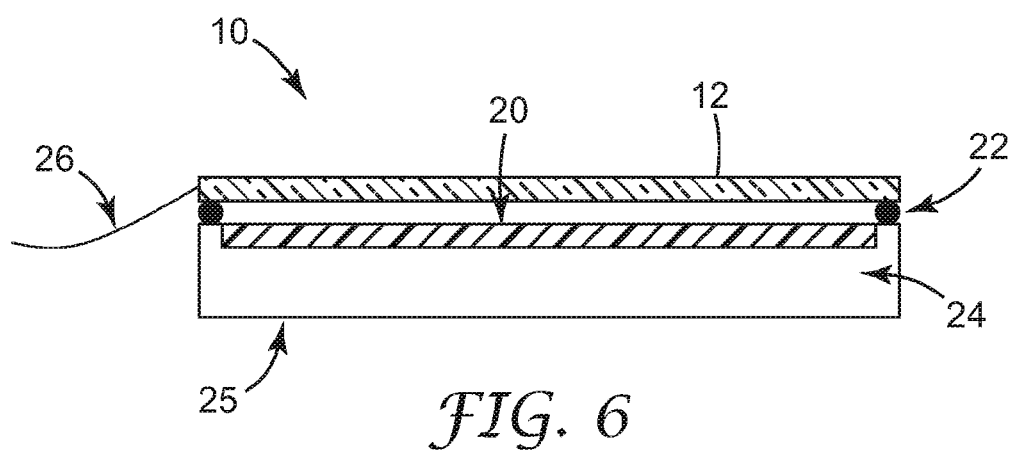
FIG. 6 is a sectional view of a touch sensitive device mounted to a display in accordance with an embodiment of the present invention.

FIG. 6 is a sectional view of a touch sensitive device 10 mounted to a display 25. The display 25 may be any suitable electronic display, such as a liquid crystal display (LCD), an electroluminescent display, a cathode ray tube display, a plasma display, a light emitting diode display, and the like. The display 25 may additionally or alternatively include static graphics that can be permanent or replaceable. The touch sensitive device 10 of the type illustrated in FIG. 6 includes a transparent substrate 12 mounted in front of an LCD screen 20.

The LCD screen 20 is mounted to a frame 24 of the LCD display 25. A foam gasket or mounting 22 is attached to the underside of the substrate 12 and extends substantially around the periphery of the substrate 12. The foam gasket 22 has adhesive surfaces whereby the substrate 12 may be securely attached to any surface. The foam gasket 22 may reduce the reflections from the edge of the substrate 12. A tail connector 26 of the touch sensitive device 10 may be connected to a controller of the touch sensitive device 10.

Figure 7:
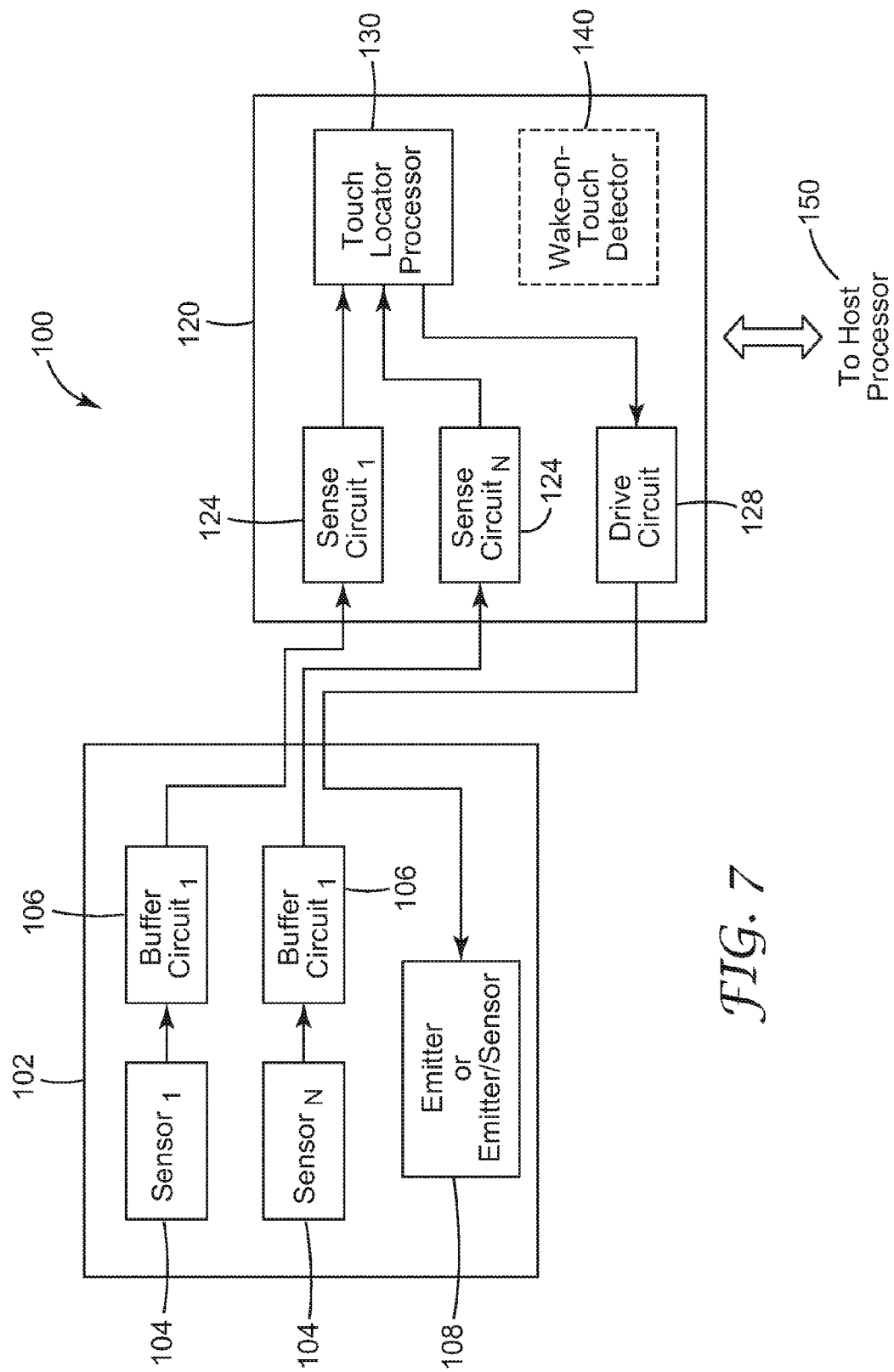
FIG. 7 is a depiction of a touch panel system that includes a touch sensitive device and a touch panel controller in accordance with an embodiment of the present invention.

FIG. 7 is a depiction of a touch panel system 100 that includes a touch sensitive device 102 and a touch panel controller 120. The touch sensitive device 102 includes at least three sensors 104, preferably four sensors 104, each coupled to an associated buffer circuit 106. The touch sensitive device 108 further includes at least one emitter transducer 108. The emitter transducer 108 may be configured to operate only as an excitation transducer or as a dual emitter/sensor transducer. Each of the buffer circuits 106 and emitter transducer 108 is coupled to the controller 120.

The controller 120 includes sense circuits 124 each coupled to one of the sensor/buffer circuit combinations 104/106. The sense circuits 124 typically include one or more of amplification, conditioning, and filtering circuitry. The emitter transducer 108 is coupled to a drive circuit 128 that generates signals that cause the emitter transducer 108 to generate predetermined excitation signals that are imparted to the substrate of the touch sensitive device 102. Each of the drive circuit 128 and sense circuits 124 is coupled to a touch location processor 130. The touch location processor 130 typically includes an analog signal conditioning stage, an analog-to-digital converter (ADC) sampling at an appropriate sampling frequency (e.g., 200 kHz), and a digital signal processor (DSP) that implements coordinate location algorithm/firmware and other algorithms and routines.

Figure 8:
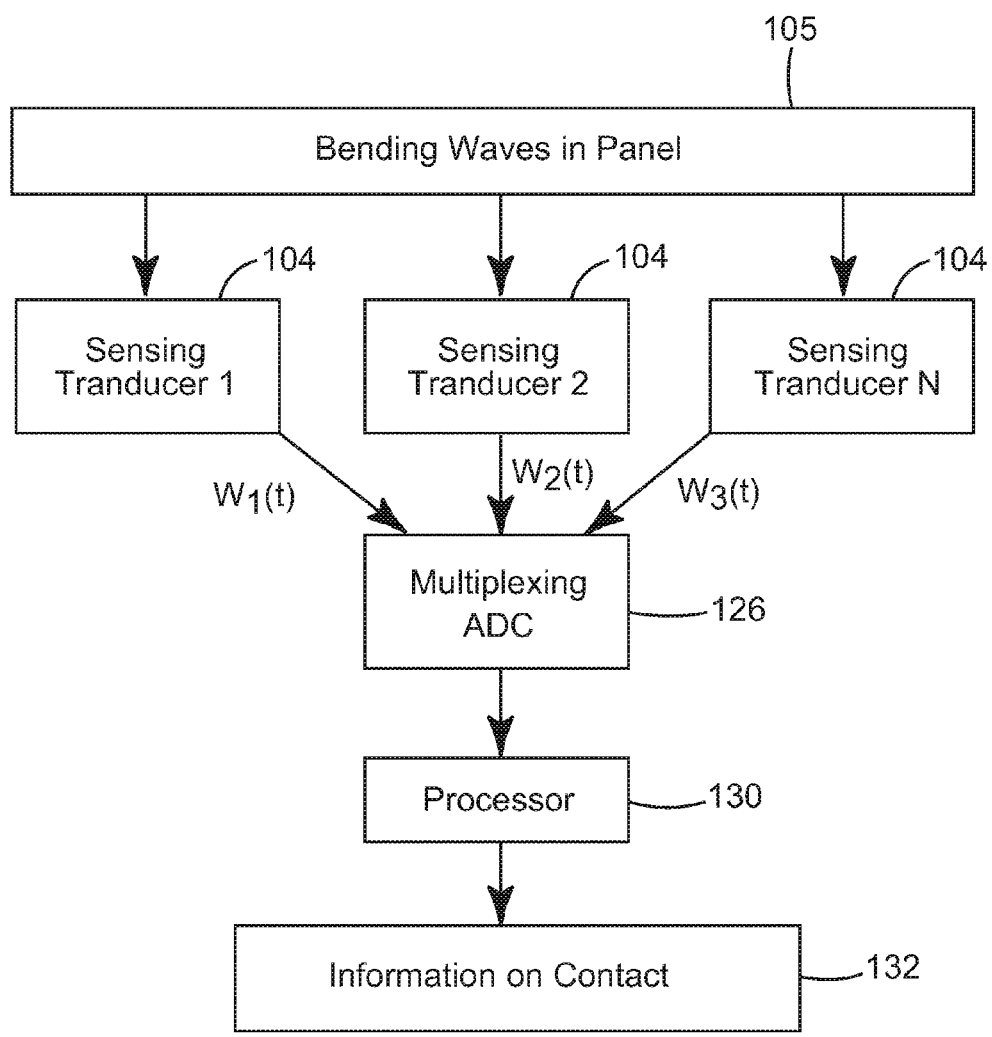
FIG. 8 illustrates an implementation for processing bending wave information obtained at each of a number of pickup sensors in accordance with an embodiment of the present invention.

For example, and with reference to FIG. 8, one implementation for processing of bending wave information sensed at each sensor 104 of FIG. 7 is illustrated. In FIG. 8, the bending waves in the panel 105 are sensed by at least three and preferably four sensors 104. The sensors 104 measure analog bending wave signals $W_1(t)$, $W_2(t)$ . . . $W_N(t)$, which are transmitted to a multiplexing ADC 126. The resultant digital input signal is transmitted to a touch location processor 130 from which information 132 relating to the location and profile of the contact impulse is determined.

Figure 9:
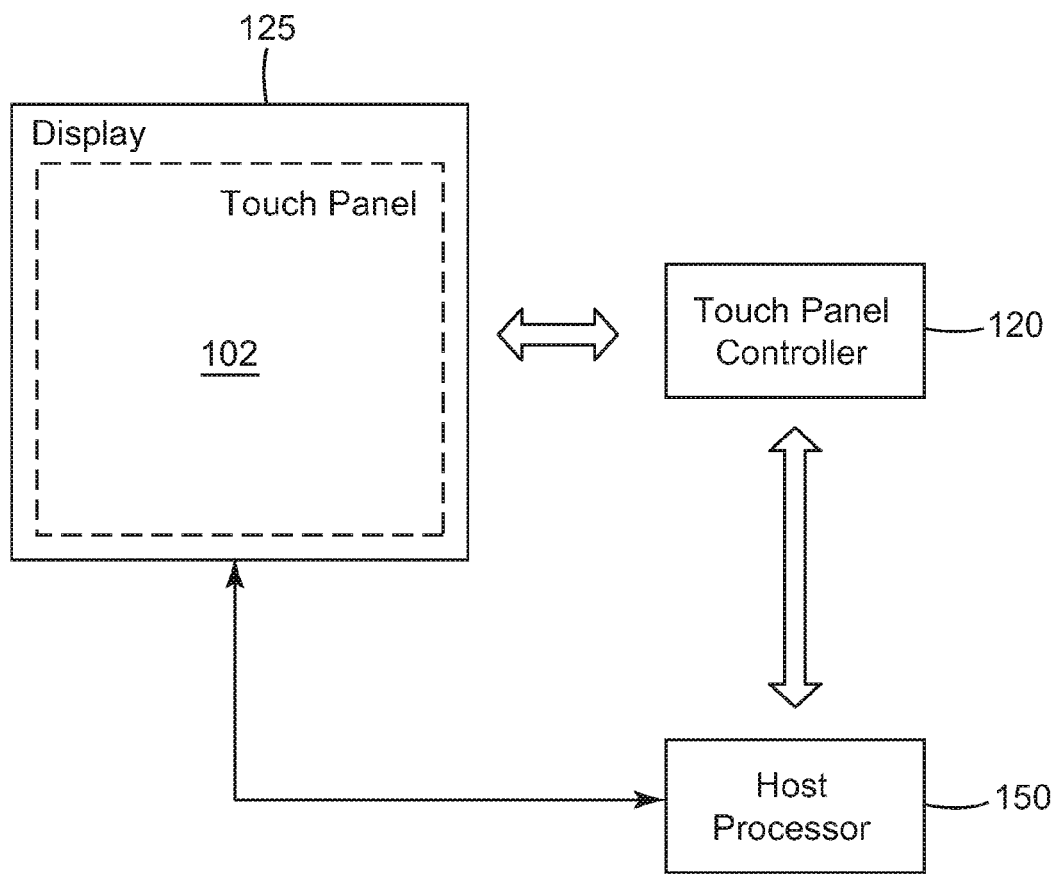
FIG. 9 illustrates a touch panel system that includes a touch sensitive device mounted to a display and coupled to a touch panel controller and host processor in accordance with an embodiment of the present invention.

As is further shown in FIG. 9, the touch panel controller 120 is typically coupled to a host processor 150. The host processor 150 is also coupled to a touch display system 125, which incorporates a touch sensitive device 102 of the type shown in FIG. 7. The host processor 150 may include a communications interface, such as a network interface, to facilitate communications between the touch panel system 100 and a remote system. Various touch panel system diagnostics, calibration, and maintenance routines, for example, may be implemented by cooperative communication between the touch panel system 100 and a remote system.

As is further shown in FIG. 7, the touch panel controller 120 may optionally include a wake-on-touch detector 140. In accordance with a general wake-on-touch approach, bending wave vibrations resulting from contact with, or otherwise imparted to, a substrate of a touch sensitive device are sensed. The sensed vibrations are analyzed or evaluated to determine if the sensed vibrations are the result of an intended touch by the user or an unintended touch to the touch sensitive device. In response to determining that the touch to the touch sensitive device was intentional, a wake-up signal is generated. If, however, it is determined that the touch to the touch sensitive device was unintentional, a wake-up signal is not generated.

The term "intended touch" refers to detectable vibrations, events causing such vibrations, and signals created due to sensors receiving such vibrations, that are intended to be interpreted as a touch input. The term "unintended touch" refers to detectable vibrations, events causing such vibrations, and signals created due to sensors receiving such vibrations, that are not intended to be interpreted as a touch input. Examples of an unintended touch include external noise as well as vibration-causing impacts to the touch sensitive device that do not produce a requisite signature in the detected signal.

The sensed vibrations are analyzed or evaluated to determine if the sensed vibrations are the result of an intended touch by the user or an unintended touch to the touch sensitive device. In general, the sensed bending wave vibrations are processed and compared to a threshold or profile that is established to facilitate discrimination between intended touches and unintended touches. Discriminating between intended touches and unintended touches can be accomplished in a number of ways, including touch signal amplitude comparisons with a threshold, filtered touch signal comparisons with a threshold, time domain evaluation (e.g., signal feature correlation analysis), and frequency domain evaluation (e.g., discrete Fourier Transform (DFT) analysis), for example. Details concerning various wake-on-touch approaches are disclosed in commonly owned co-pending U.S. patent application Ser. No. 10/683,342, filed Oct. 10, 2003, which is incorporated herein by reference.

Figure 10:
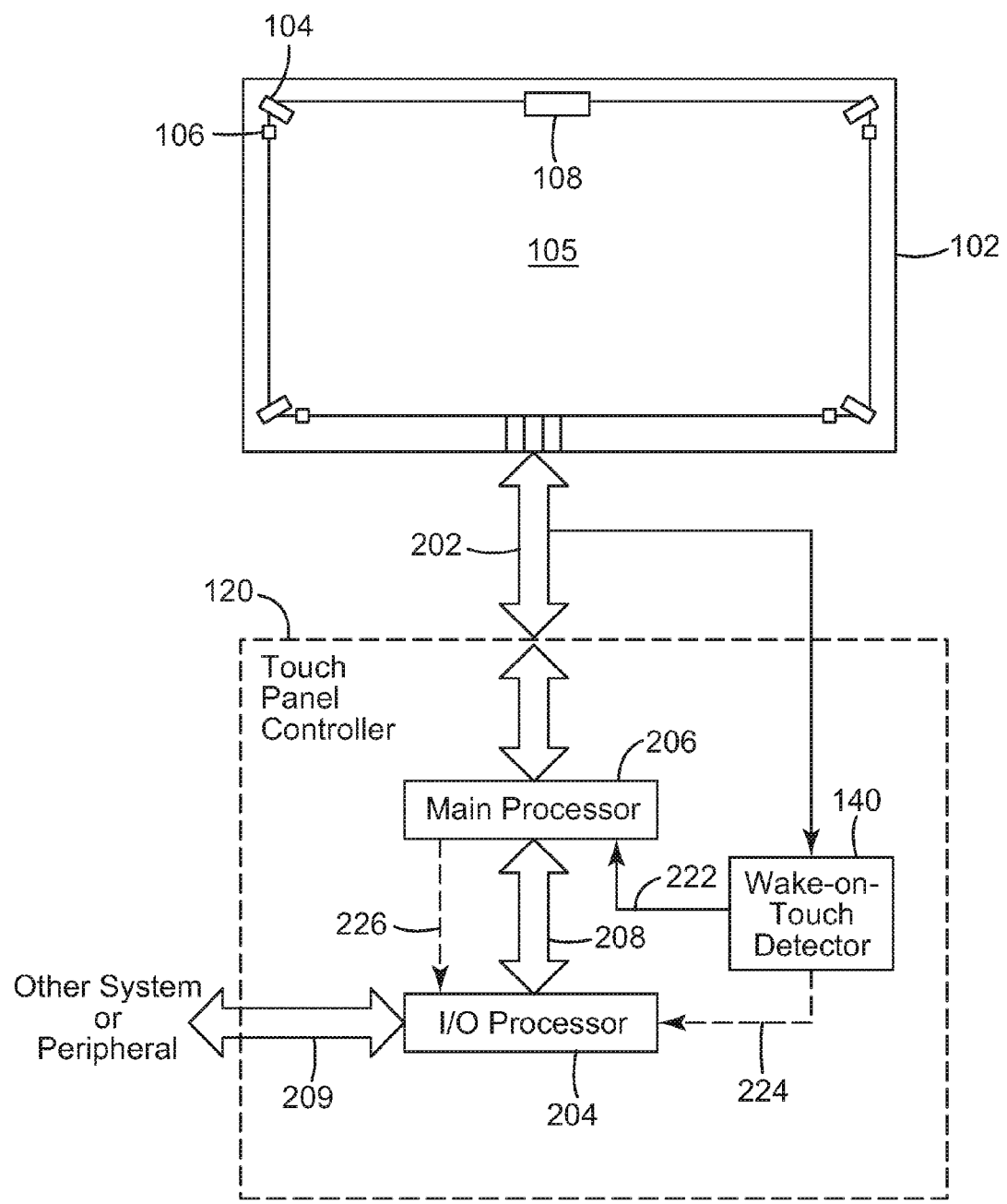
FIG. 10 shows an embodiment of a touch panel controller communicatively coupled to a touch sensitive device in accordance with the present invention.

FIG. 10 shows an embodiment of a touch panel controller 120 communicatively coupled to a touch sensitive device 102. According to this embodiment, touch panel controller 120 includes an I/O processor 204 coupled to main processor 206 via a bus 208. The I/O processor 204 is employed in this embodiment to manage I/O signalling between the touch panel controller 120 and an external system or device via bus 209.

In one configuration, I/O processor 204 is implemented to manage signalling over a high-speed interface 209, such as a serial interface or bus. By way of example, bus 209 may conform to a high-speed serial bus architecture, such as a USB (Universal Serial Bus) or IEEE 1394 Fire Wire architecture, and I/O processor 204 can be implemented to coordinate signalling over serial bus 209. Configuring bus 209 in accordance with a USB or Fire Wire specification offers instant plug and play connectivity. As such, touch panel controller 120 can be plugged into, and unplugged from, different ports at any time with no adverse consequence regarding connectivity.

As is shown in FIG. 10, wake-on-touch detector 140 is coupled to the I/O processor 204, interface 202, and optionally to main processor 206. In another configuration, wake-on-touch detector 140 can be coupled to the front end of the I/O processor 204 or be incorporated as an interface between I/O processor 204 and bus 202. The wake-on-touch detector 140 is preferably configured to receive sense signals from the touch sensitive device 102 yet not adversely affect transmission of sense signals and other signals or data between the touch sensitive device 102 and touch panel controller 120.

According to one configuration depicted in FIG. 10, wake-on-touch detector 140 can be coupled to the I/O processor 204, such that a wake-up signal generated by wake-on-touch detector 140 is transmitted to I/O processor 204 via line 222. In this configuration, the I/O processor transitions from a sleep mode to an active mode in response to the wake-up signal. After transitioning from sleep to active mode, the I/O processor 204 may determine whether other components require activation, such as the main processor 206 or other components of the touch panel controller 120 and/or control system of the portable device incorporating the touch sensitive device 102. Alternatively, the I/O processor 204 may generate a secondary wake-up signal that is transmitted via line 226 to the main processor 206 via bus 208. In another configuration, wake-on-touch detector 140 can generate a wake-up signal and transmit the wake-up signal to both I/O processor 204 (via line 222) and main processor 206 (via line 224).

In the configuration of the touch sensitive device 102 shown in FIG. 10, each of the sensors 104 is coupled to a buffer circuit 106. Because the buffer circuits 106 have active components (e.g., JFET), power must be supplied to the buffer circuits 106 when active. As such, the sensors 104 are poor candidates for wake-on-touch sensors in applications where power conservation is an issue. The emitter transducer 108, however, is not coupled to a buffer circuit 106, making the emitter transducer 108 a good candidate for a wake-on-touch sensor.

It is readily appreciated that a wake-on-touch methodology according to this embodiment can significantly reduce power consumption of touch sensitive devices, particularly portable and hand-held touch input devices. For example, each of main processor 206 and I/O processor 204 can require several hundred milliamps of current during normal operation. With the use of wake-on-touch detection using the emitter transducer 108, most of the circuitry of main processor 206 and I/O processor 204 can be turned off in sleep mode, thereby appreciably reducing power requirements to a small fraction of that required for full operations.

Provision of a dedicated excitation transducer operating in cooperation with pick-up sensors on a touch panel allows for implementation of a wide variety of new and useful touch detection system operating and diagnostic capabilities. Such capabilities include, for example, enhanced lift-off detection, improved sensitivity to light touches, and improved wake-on-touch functionality. These and other enhanced capabilities may be implemented using certain stimuli generated by the excitation transducer and processing of signals produced by pickup sensors in response to such stimuli.

For example, lift-off detection methodologies and techniques directed to increasing sensitivity to light touches, as are described in commonly owned co-pending U.S. patent application Ser. No. 10/750,291 entitled "Touch Sensing with Touch Down and Lift Off Sensitivity," filed concurrently herewith and incorporated herein by reference, may be implemented by generation of a single tone applied to the excitation transducer, such as a tone with a fundamental frequency of 50 kHz, for example. The single tone preferably has a frequency above the audible range, such as a non-audible tone having a frequency equal to one-quarter of the sampling frequency. According to other lift-off detection/enhanced light touch sensitivity approaches described in the previously incorporated U.S. patent application Ser. No. 10/750,291 filed, offsetting the spatial variation of sensitivity to lift-off events can be achieved by application of stimuli with multiple frequencies in parallel. It is noted that, when choosing multiple frequencies, spatial periodicity should be avoided.

By way of further example, use of a broadband noise stimulus for lift-off detection/enhanced light touch sensitivity may be implemented in a manner generally similar to that of the single frequency measurement. Broadband noise stimuli in the frequency range of 50 kHz to 75 kHz, for example, may be used in such an approach. A beneficial aspect of this approach concerns a spread spectrum content that encompasses more spatial information. This property can provide for greater uniformity of response sensitivity over the area of the touch plate, obviating the need for parallel calculations in different frequency bands.

In accordance with another lift-off detection/enhanced light touch sensitivity approach described in the previously incorporated U.S. patent application Ser. No. 10/750,291 filed, a swept tone may be used to measure the spectrum of the touch plate response over a given bandwidth. For example, a chirp signal may be the stimulus and the measured signal is demodulated synchronously with this signal. This approach has the advantage that it may be very robust to noise in the signal due to the highly deterministic nature of the stimulus signal and detection process. A lift-off detection/enhanced light touch sensitivity algorithm may be implemented with a swept tone having a 50-75 kHz sweep, for example.

Another approach to generating a stimulus signal for lift-off detection/enhanced light touch sensitivity is to drive the touch panel above $f_s/2$, where $f_s$ is the sample frequency. Generally, sampled systems are driven below $f_s/2$, such that the sensing analog-to-digital (ADC) converter correctly captures the information in the signal according to the Nyquist criterion. ADCs usually employ an anti-aliasing filter to limit the signal level at frequencies above $f_s/2$. For ADCs that are capable of capturing signals at frequencies much greater than the sample frequency, if signals greater than $f_s/2$ are picked up by the ADC, such signals will be registered as aliased signals at a lower frequency.

There are a number of ways in which aliasing may be used to enhance lift off detection. Initially, use of high frequencies serves to reduce the spatial wavelength in the touch plate, which reduces the spatial sensitivity of the touch plate response due to a small contact. Use of multiple single tones may improve the spatial uniformity of sensitivity to lift-off. Use of aliased signals above $f_s/2$ allows additional freedom in the choice of such a set of frequencies. Additionally, aliasing may be used such that the set of stimulus frequencies are sampled at the same in-band frequency.

Another advantage of using an aliasing method is that the signal of interest may be tuned into a frequency band previously unavailable or undesirable, such as the audible band below 20 kHz, which, if a stimulus signal were present in this band, would likely generate audible acoustic radiation from the induced vibration of the touch plate. Using an aliasing method, the frequency at which the aliased signal may be sampled may be tuned by the difference between the sample frequency and the stimulus frequency, for example. This method may be applied to single frequencies, multiple frequencies, swept tones, and broadband noise signals.

A particularly advantageous implementation of an aliasing method involves the use of $f_s$ as the frequency of the stimulus signal. According to this approach, the aliased frequency is dc, and sensing of the high frequency stimulus results in a dc offset determined by the amplitude and phase of the pickup signal. Driving the stimulus signal at the sample frequency has a number of advantages, several of which are described in the previously incorporated U.S. patent application Ser. No. 10/750,291.

A variety of enhanced calibration and diagnostic methodologies may be realized by incorporation and use of a dedicated excitation transducer in combination with pickup sensors of a touch sensitive device. For example, various touch plate and pickup sensor calibration processes may be implemented using a dedicated excitation transducer in combination with pickup sensors. According to one touch plate calibration methodology of the present invention, the dimensions of the touch plate or substrate can be sensed and determined. Automatic sensing of touch plate dimensions enables the same touch panel controller to be used across many different sizes and aspect ratios of pickup sensors.

Figure 11:
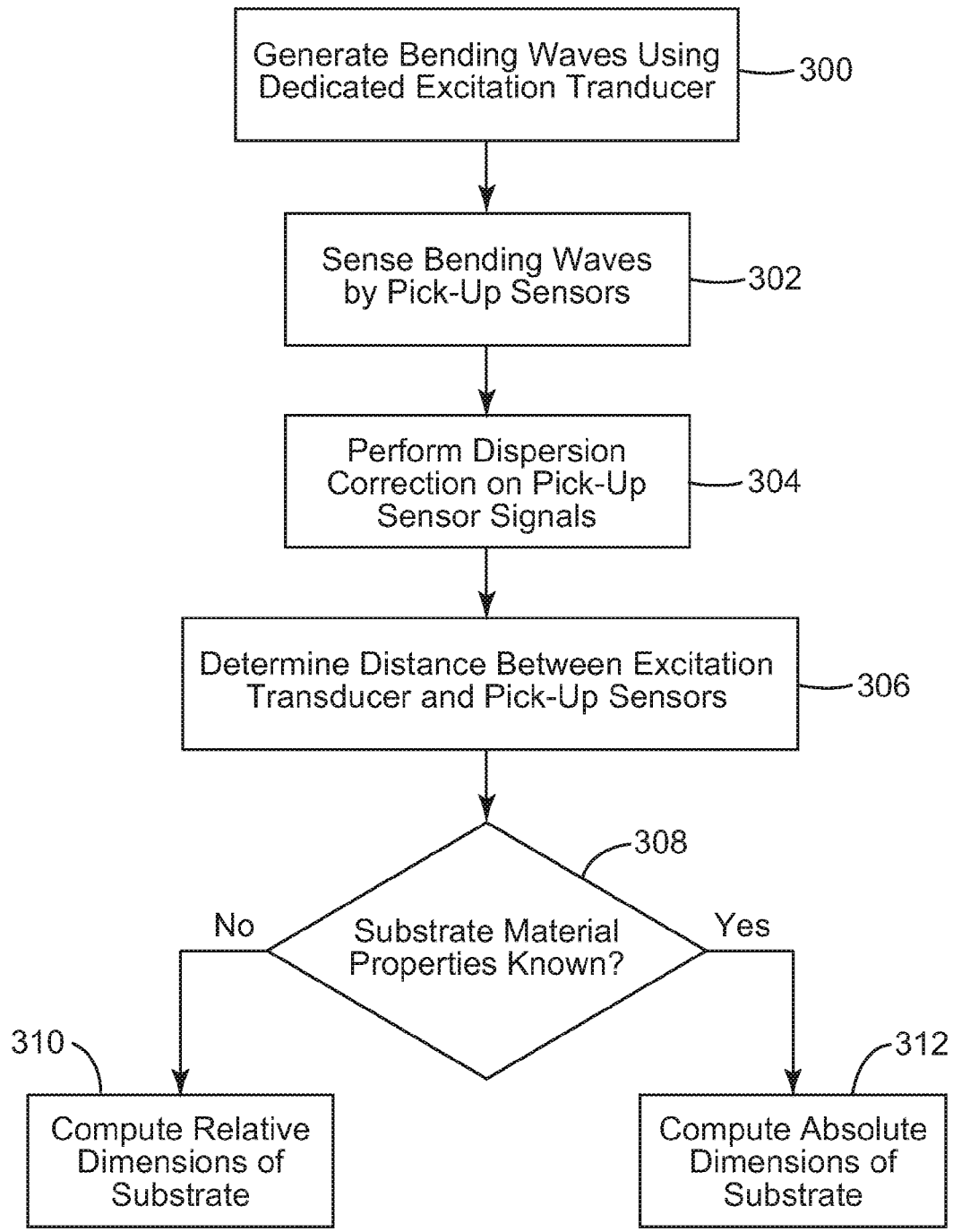
FIG. 11 illustrates an implementation for performing a touch plate calibration using dispersion corrected sensor data in accordance with an embodiment of the present invention.

In the embodiment depicted in FIG. 11, for example, the dedicated excitation transducer is used to generate 300 bending waves that are sensed 302 by the pickup sensors positioned in the corners of the touch substrate. The excitation stimulus may be either a pulsed stimulus or a wide band noise-like stimulus. The pickup signals output by the pickup sensors may be processed in a dispersive manner, such as by the conversion 304 of each of the pickup signals to one of an equivalent non-dispersive system as previously described. The relative distance from the excitation transducer to each of the pickup sensors is computed 306. An alternative approach for determining relative distance between the excitation transducer and pickup sensors involves the removal of a fixed amount of dispersion for the investigation of first arrival times. In another alternative approach, the excitation signals may be focused on a narrow frequency band and relative arrival times to each of the pickup sensors may be estimated. These and other approaches are described in greater detail below.

If the absolute dispersion relation of the touch plate material is known 308, the absolute dimensions of the touch plate may be computed 312. If, however, the absolute dispersion relation of the touch plate material is not known 308, only the relative dimensions of the touch plate may be computed 310. Knowledge of the absolute dispersion relation of the touch plate is required to determine the absolute dimensions of the plate since the material properties of the touch plate determine the absolute velocity of wave propagation across the touch plate as a function of frequency. Without this knowledge, the touch plate dimensions are only known in normalized coordinates.

Even if the material of the touch plate is unknown and absolute size of the plate can not be directly computed, knowledge of the dimensions as a function of the wavelength in the touch plate is sufficient for the contact location algorithm to determine the contact location as a normalized coordinate. It is noted that this method may either be used to determine parameters for the algorithm directly or to recognize the touch plate dimensions from a selection table, for example.

When performing the calculation of contact location, it is advantageous if the pickup sensors have very similar phase responses. However, the characteristics of a given sensor's phase response are closely related to the mounting arrangement of the sensor on the touch plate and also the mounting arrangement of the touch plate within an integrated system. By way of example, pickup sensors will typically have a different phase response relative to one another where the touch plate is mounted on a stiff foam that is attached in close proximity to the sensors, and arranged differently at each corner. Dissimilar phase responses of the sensor may corrupt the touch location computation. For example, the peak in a dispersion corrected correlation function may be skewed and lower in magnitude.

One approach to permitting some degree of mounting/integration variation involves correcting the pickup sensor signals for the phase response of the sensor. This can be readily accomplished given a knowledge of the sensor phase response. The dedicated excitation transducer may be used to determine sensor phase response.

The plate calibration technique described above with reference to FIG. 11 may be viewed and implemented as a measure of the phase delay as a function of frequency of the direct wave produced by the excitation transducer relative to each of the pickup sensors. Most of this phase delay is associated with the distance to each of the sensors, which allows for the measurement of touch plate dimensions. However, some further phase variation may be due to the phase response of the sensor. Once the touch plate dimensions are determined, this remainder is readily obtainable from the measurement of total phase delay.

Figure 12:
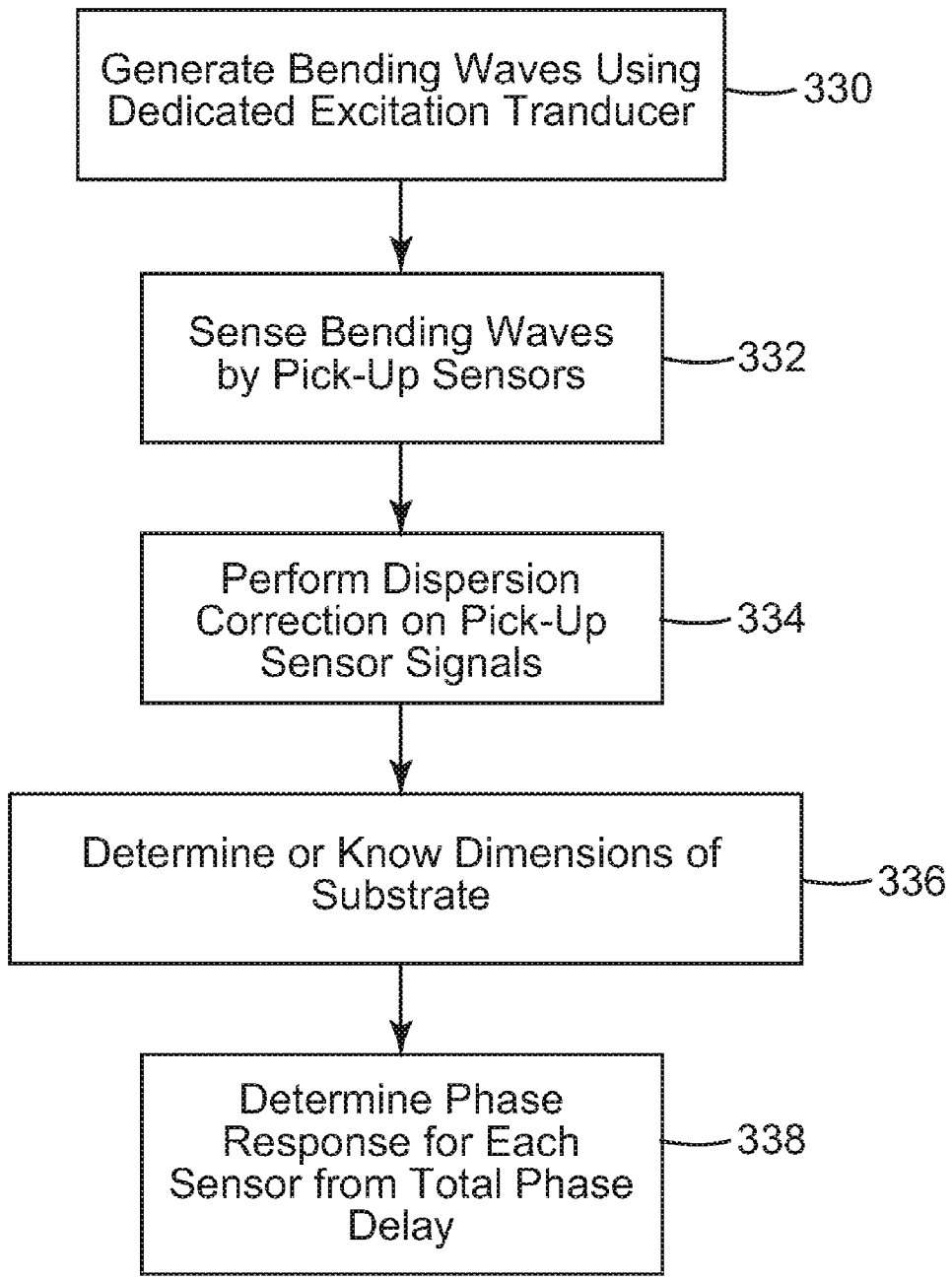
FIG. 12 illustrates an implementation for determining the phase response for individual pickup sensors using dispersion corrected sensor data in accordance with an embodiment of the present invention.

According to the approach depicted in FIG. 12, bending waves are generated 330 using the dedicated excitation transducer that are sensed 332 by the pickup sensors positioned in the corners of the touch substrate. The excitation stimulus, as in the illustrative example of FIG. 11, may be either a pulsed stimulus or a wide band noise-like stimulus. Dispersion correction is performed 334 on the pickup sensor signals. The dimensions of the touch substrate are either determined 336 in a manner discussed above or otherwise known. The phase response for each of the pickup sensors may be determined 338 from knowledge of the total phase delay.

Use of a dedicated excitation transducer to measure the phase response of a pickup sensor allows correction of the measured pickup signals to accommodate for such sensor phase response. This, in turn, allows for less stringent build tolerances and a broader range of system integration possibilities. Furthermore, some integration schemes that incorporate stiff foam in the vicinity of the sensor realize improved sensitivity of the device to light touches, resulting from influence on touch panel stresses in the vicinity of the sensor. The phase response correction approach described herein makes such integrations more robust to slight variations between sensors and, therefore, an option for improved sensitivity to light touches.

The plate and sensor calibration approaches describe herein preferably use a dedicated excitation transducer as a generator of bending waves, which are subsequently sensed by at least three sensors, and more preferably, by four corner sensors. In the context of various calibration approaches described below, it is useful to obtain the transfer function of the input at the excitation transducer to the output at each of the sensors. This transfer function may be obtained using a number of standard methods. Such known methods include the following: stimulation by a maximum length sequence (MLS) signal and cross-correlation to obtain the impulse response; use of an adaptive filter with a noise-like signal; averaged ratio of complex frequency responses; direct input and measurement of an impulse; and measurement of a linear chirp signal with Time Delay Spectrometry (TDS), among others.

Figure 13:
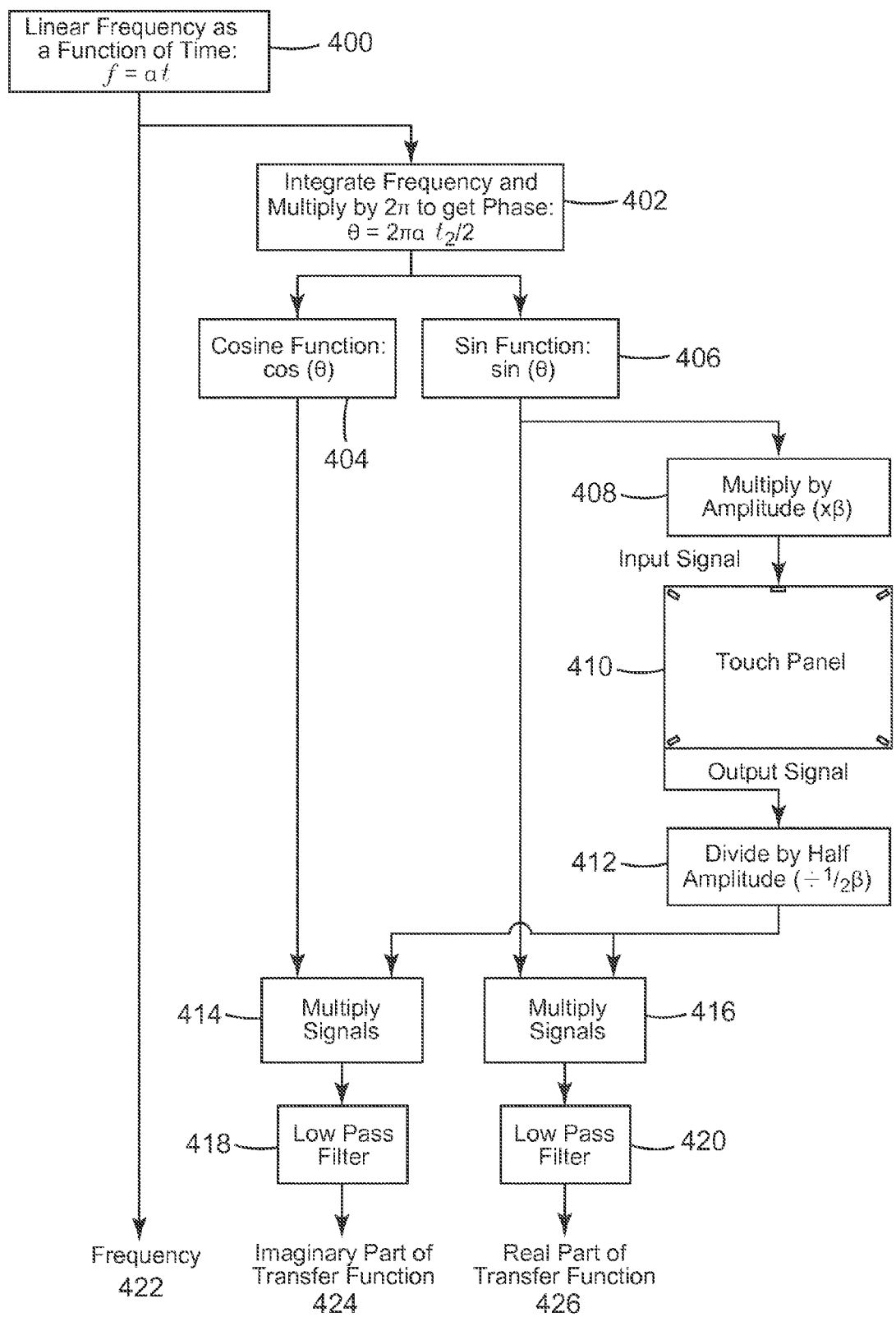
FIG. 13 illustrates an implementation for determining the transfer function of the input at an excitation transducer to the output at each of a number of pickup sensors in accordance with an embodiment of the present invention.

A TDS method uses a linear chirp signal to stimulate the system. The response is then demodulated with both an in-phase stimulus (sine) and also one 90 degrees out of phase (cosine). This yields both the real and imaginary components of the frequency response. As shown in FIG. 13, a linear chirp signal is generated at block 400. The frequency is integrated and multiplied by $2\pi$ to obtain the phase of the signal. Cosine and sin functions ($\cos(\theta)$ and $\sin(\theta)$) are generated at blocks 404, 406, and used to synchronously demodulate the sensor response. The sin function, $\sin(\theta)$, is multiplied by an amplitude, $\beta$, at block 408 and defines the input signal or stimulus applied to the excitation transducer.

In response to application of the stimulus, bending waves are produced in the touch panel at block 410 and sensed by a pickup sensor, which produces an output signal. The output signal is divided by half the amplitude, $\beta$, at block 412. This signal is multiplied by each of the cosine and sin functions, $\cos(\theta)$ and $\sin(\theta)$, at blocks 414, 416, and respectively low pass filtered at blocks 418, 420. The TDS method provides the frequency, and the real and imaginary components of the frequency response at blocks 422, 424, and 426, respectively.

Figure 14:
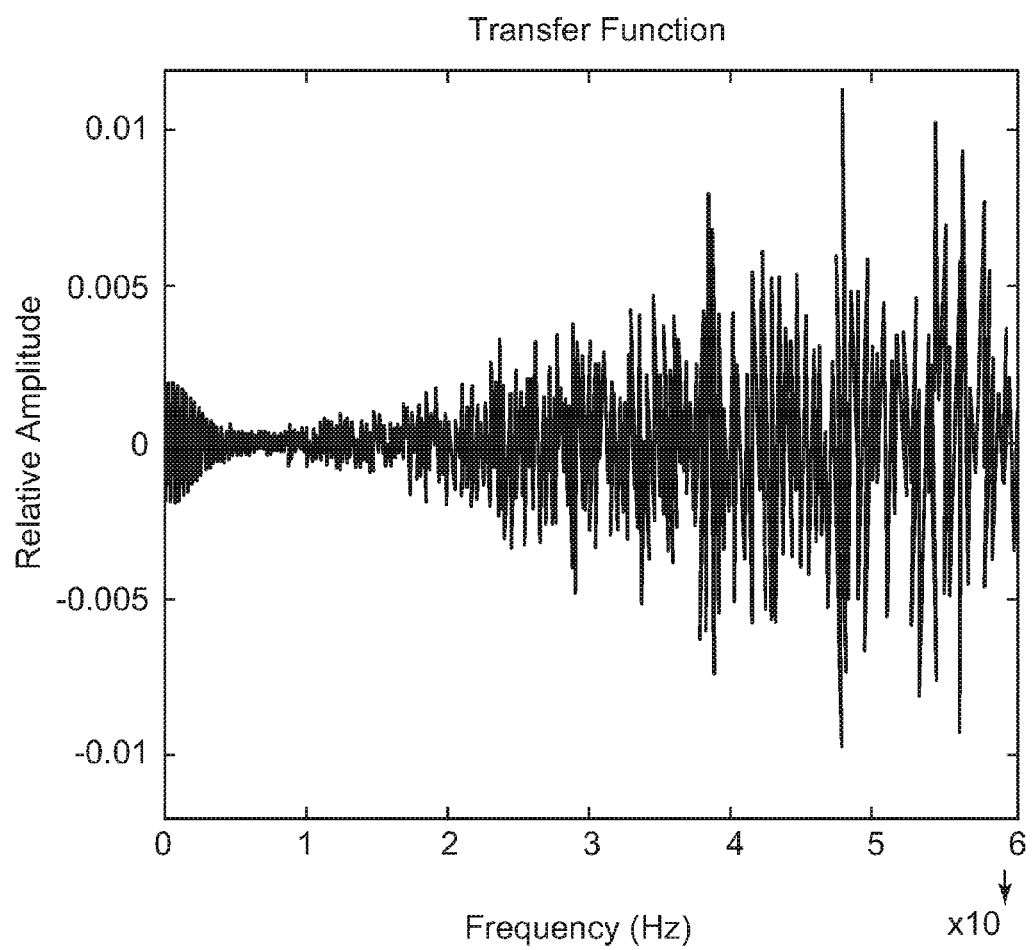
FIG. 14 shows an illustrative example of a measured transfer function derived by use of the implementation depicted in FIG. 13.

One advantage of the TDS method is that it may have excellent noise rejection performance due to the highly correlated nature of the stimulus signal used. In fact, arbitrarily high performance may be achieved with slower sweep rates combined with lower cut-off frequencies of the low pass filter. FIG. 14 shows an example of a measured transfer function. It is noted that the feature at the low frequency end is an artefact of the method used, and is subsequently windowed out.

The TDS method described above is but one example of a number of different methods that may be employed to determine the transfer function from the excitation transducer to each of the corner sensors. Other examples may determine the transfer function in either the time domain or the frequency domain. Conversion between these two domains is readily performed with the use of a Fast Fourier Transform (FFT).

Figure 15:
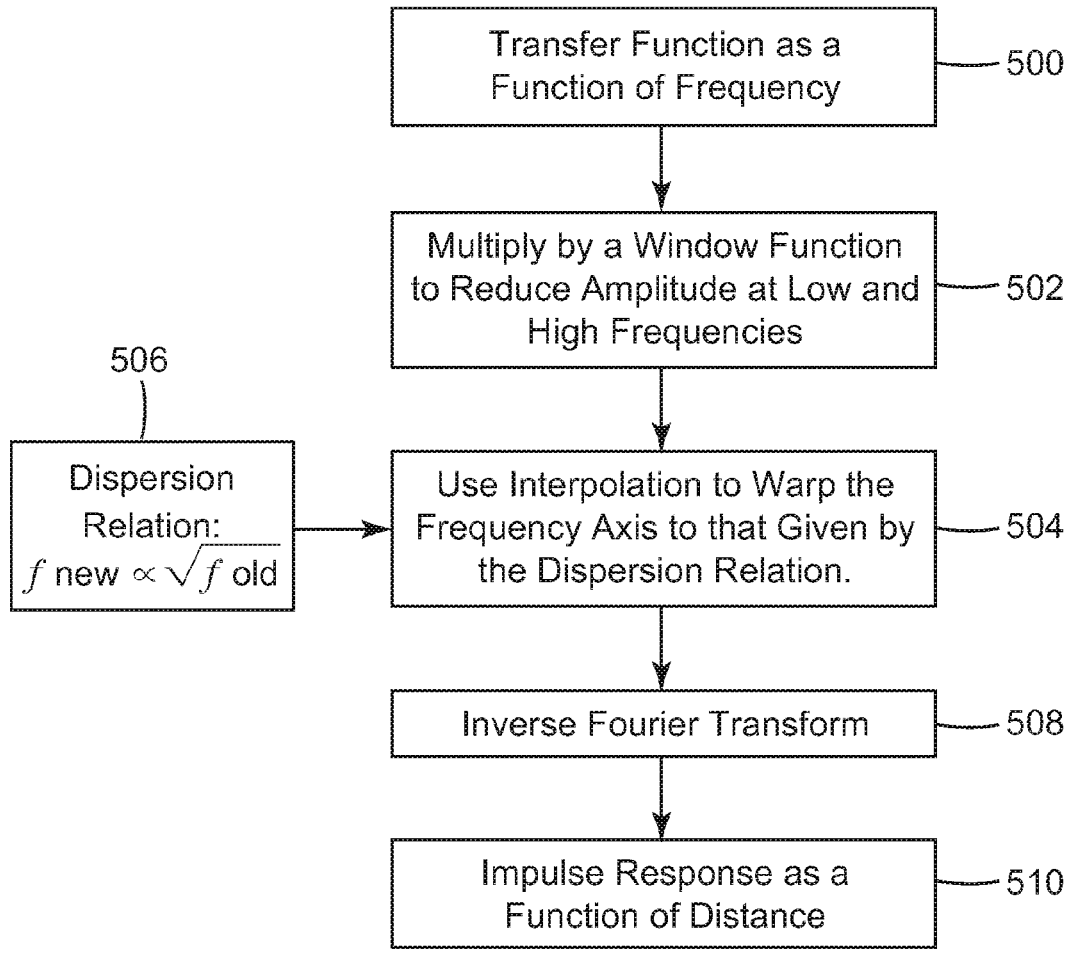
FIG. 15 illustrates a process for obtaining the impulse response as a function of touch distance in accordance with an embodiment of the present invention.
Figure 16:
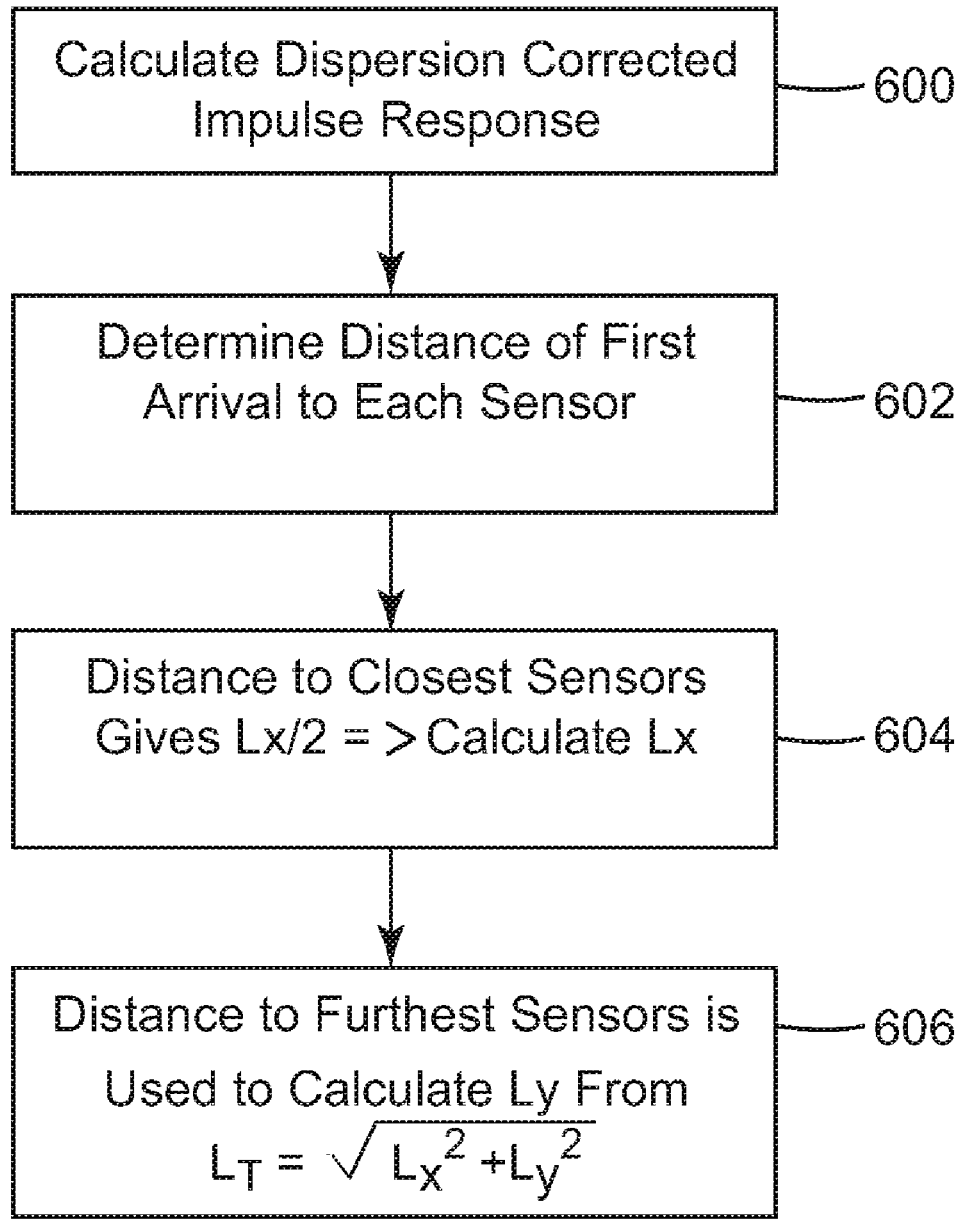
FIG. 16 illustrates a calibration method for calculating the dimensions of a touch sensitive plate using a dispersion corrected impulse response as determined by the processes shown in FIG. 15 in accordance with an embodiment of the present invention.

Various performance and calibration processes may be performed using an excitation transducer of the type described herein after determining the transfer function of the input at the excitation transducer to the output at each of the pickup sensors respectively provided on the touch sensitive plate. FIG. 16, for example, illustrates an approach to calculating the dimensions of a touch sensitive plate using a dispersion corrected impulse response as determined by the processes shown in FIG. 15. FIG. 15 depicts a process for obtaining the dispersion corrected impulse response as a function of touch distance.

In general, the dimensions of a touch sensitive plate may be determined using the transfer function measurement described above with reference to FIG. 13. As discussed earlier, knowledge of the material of the touch sensitive plate is required to determine the absolute dimensions of the plate, since this determines the absolute velocity of waves as a function of frequency. Without this knowledge, the plate dimensions are only known in normalised coordinates.

As is shown in FIG. 15, the transfer function may be multiplied by a window function 502 to reduce amplitude at low and high frequencies. Dispersion results from the dependence of the bending wave velocity on frequency, which for pure bending is a square root dependence, as indicated in block 506. Previously incorporated U.S. patent application Ser. No. 09/746,405 describes a method by which the dispersion of a signal may be corrected by a transformation that interpolates the frequency axis of a transfer function onto a wave vector, indicated generally in block 504. Taking the inverse FFT 508 then yields an impulse response 510 as a function of distance, with all frequency components aligned to correct for the effects of dispersion. If the absolute velocity as a function of frequency is known from knowledge of the material properties of the touch sensitive panel, then the dispersion corrected impulse response may be returned as a function of absolute distance. If, however, this relationship is not known, then an arbitrary scaling of the distance axis still allows useful information to be determined, such as the aspect ratio of the touch sensitive plate.

Referring now to FIG. 16, after the dispersion corrected impulse response is determined 600, such as by the approach depicted in FIG. 15, the distances of the pickup sensors relative to the excitation transducer are determined 602 based on first arrival of excitation transducer energy at the respective pickup sensors. The distance from the excitation transducer to the two closest corner pickup sensors is determined as the position of the first peak in the response corresponding to the first arrival of energy at each pickup sensor. This distance, therefore, corresponds to half the total width of the plate ($L_x$), as indicated in block 604. The height dimension of the plate ($L_y$) may be determined from the similar distance for first arrival to the other two pickup sensor ($L_T$), together with the following equation:

$$L_T = \sqrt{L_x^2 + L_y^2}$$

The method described above represents one of several methods for determining the dimensions of a touch sensitive plate. Several additional methods will now be described. It is noted that some of the methods described herein for determining the dimensions of a touch sensitive plate do not require computation and use of a dispersion corrected impulse response. For example, various time of flight techniques may be used to determine touch sensitive plate dimensions, such techniques being applicable to both dispersive and non-dispersive mediums. The following additional methods for determining the dimensions of a touch sensitive plate include those that utilize a dispersion corrected impulse response and those that utilize a time of flight technique.

According to a first additional method, normalized plate dimensions are determined using a technique very similar to that described above with reference to FIGS. 15 and 16. In this first additional approach, it is assumed that the absolute dimensions of the touch sensitive plate are unknown, due to the lack of knowledge of the absolute material dispersion relation. Here, the dispersion corrected correlation function is returned with an arbitrarily scaled x-axis. The same process shown in FIG. 16 may be followed to provide touch sensitive plate dimensions that are provided in arbitrary units. This, however, allows for the determination of the aspect ratio of the touch sensitive plate, but not absolute dimensions.

In accordance with a second additional method for computing the dimensions of a touch sensitive plate, a measurement of phase as a function of frequency of the first arrival to each pickup sensor may be used to determine plate dimensions. In this approach, the phase may be obtained straightforwardly from the frequency response, which is then unwrapped to remove phase jumps. In order to apply this approach to the task of plate calibration, it is important that the frequency response is dominated by the first arrival of energy to the pickup sensor. This may be the case when the touch sensitive plate is supported by an absorbing edge termination. Alternatively, a scaling function may be applied to the time domain data to damp out reverberation in the touch sensitive plate, leaving the first arrival as the main source of energy detected by each pickup sensor.

Figure 17:
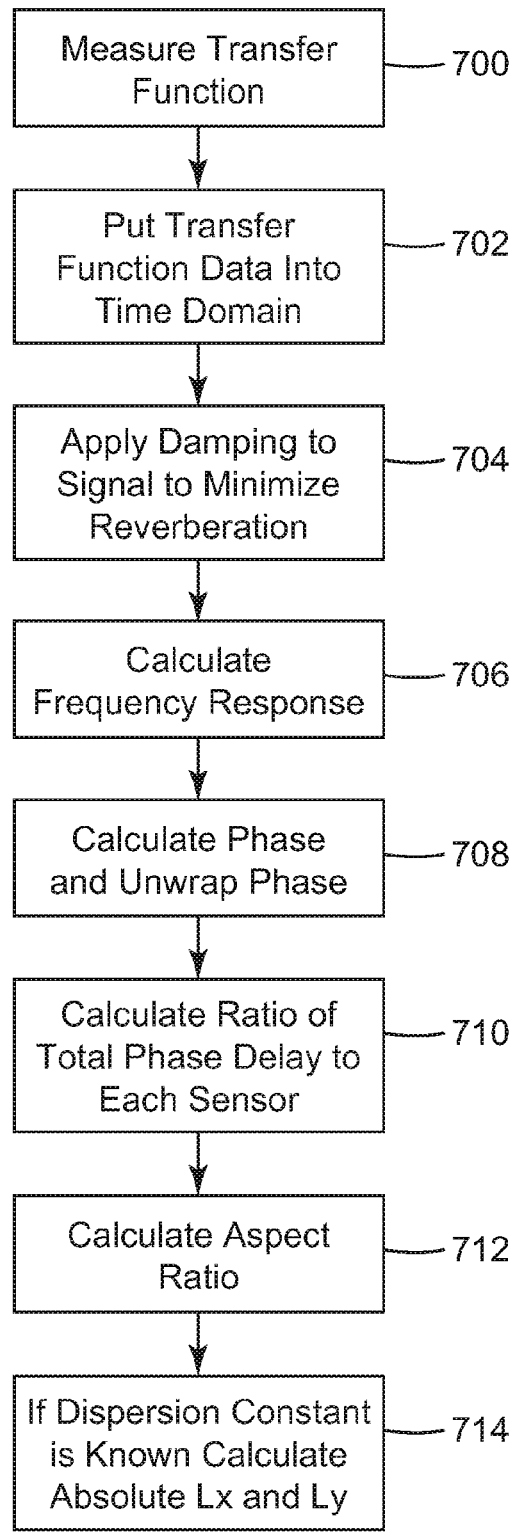
FIG. 17 illustrates another calibration method for calculating the dimensions of a touch sensitive plate based on phase delay measurements in accordance with an embodiment of the present invention.

FIG. 17 illustrates this second additional method. It is noted that this approach does not require dispersion correction and may be implemented on the raw transfer function data or dispersion corrected data. As is depicted in FIG. 17, the transfer function of the input at the excitation transducer to the output at each of the sensors is measured 700, such as by one of the several approaches identified above. The transfer function data is transformed into the time domain 702. Damping is applied 704 to minimize reverberation in the signal, which enhances detection of the first arrival energy. The frequency response of the transfer function is calculated 706.

The phase is calculated and then unwrapped 708. The ratio of the total phase delay to that associated with each pickup sensor is calculated 710. From this information, the aspect ratio of the touch sensitive plate may be calculated 712. If the dispersion constant is known, the absolute dimensions of the touch sensitive plate may be computed 714, as discussed previously.

Figure 18:
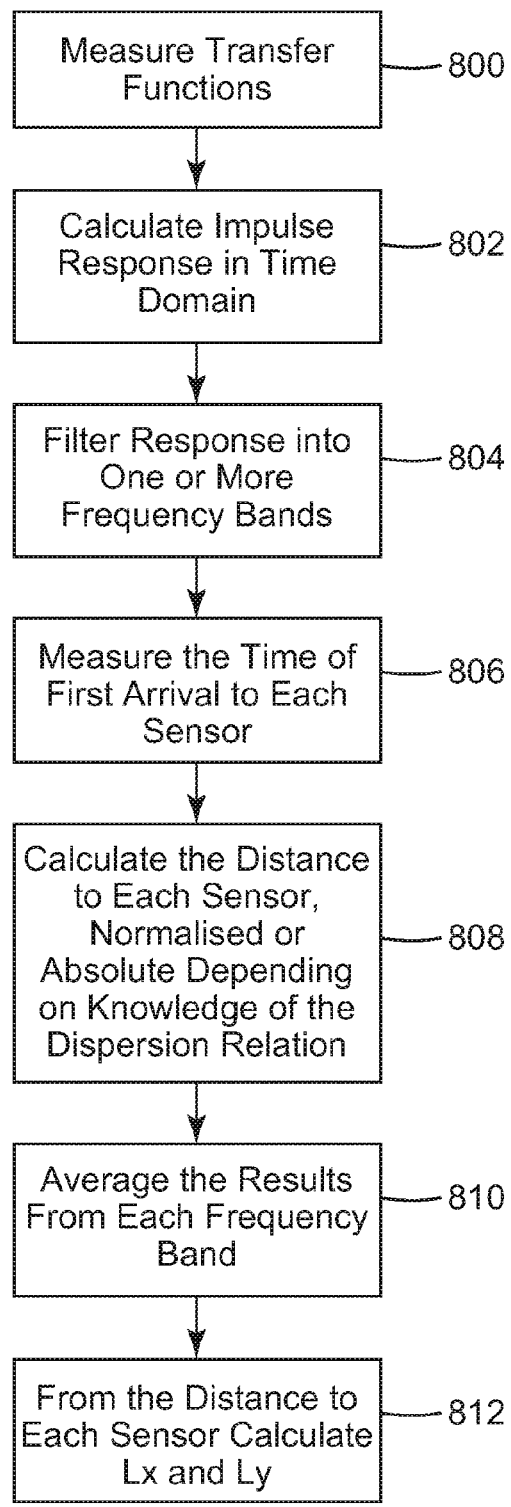
FIG. 18 illustrates yet another calibration method for calculating the dimensions of a touch sensitive plate using a time of flight technique in accordance with an embodiment of the present invention.

FIG. 18 illustrates a third additional method for performing touch sensitive plate calibration in accordance with the present invention. The method shown in FIG. 18 utilizes time of flight. In a dispersive medium, time of flight may be usefully employed if the dispersion of the wave is not excessive. According to this approach, the pickup sensor signals may be filtered into one or more frequency bands and the relative arrival time to each sensor may be determined. One implementation of this methodology is illustrated in FIG. 18.

As is shown in FIG. 18, the transfer function of the input at the excitation transducer to the output at each of the sensors is measured 800, such as by one of the several approaches identified above, and the impulse response is calculated 802 in the time domain. The impulse response is filtered 804 into one or more frequency bands to enhance detection of the first arrival of energy at each of the pickup sensors. The time of arrival of the first arrival energy at each of the sensors is calculated 806. The distance to each pickup sensor is calculated 808 in a manner previously described. The calculated distance may be a normalized or an absolute distance, depending on whether the dispersion constant is known. This calculation may be performed for each of the frequency bands employed in the filtering block 804. Assuming that more than one frequency band is employed in the filtering block 804, the distance calculations for each of the frequency bands are averaged 810 for each pickup sensor. Using the distance calculations to each of the pickup sensors, the width ($L_x$) and height ($L_y$) of the touch sensitive plate may be computed.

Figure 19:
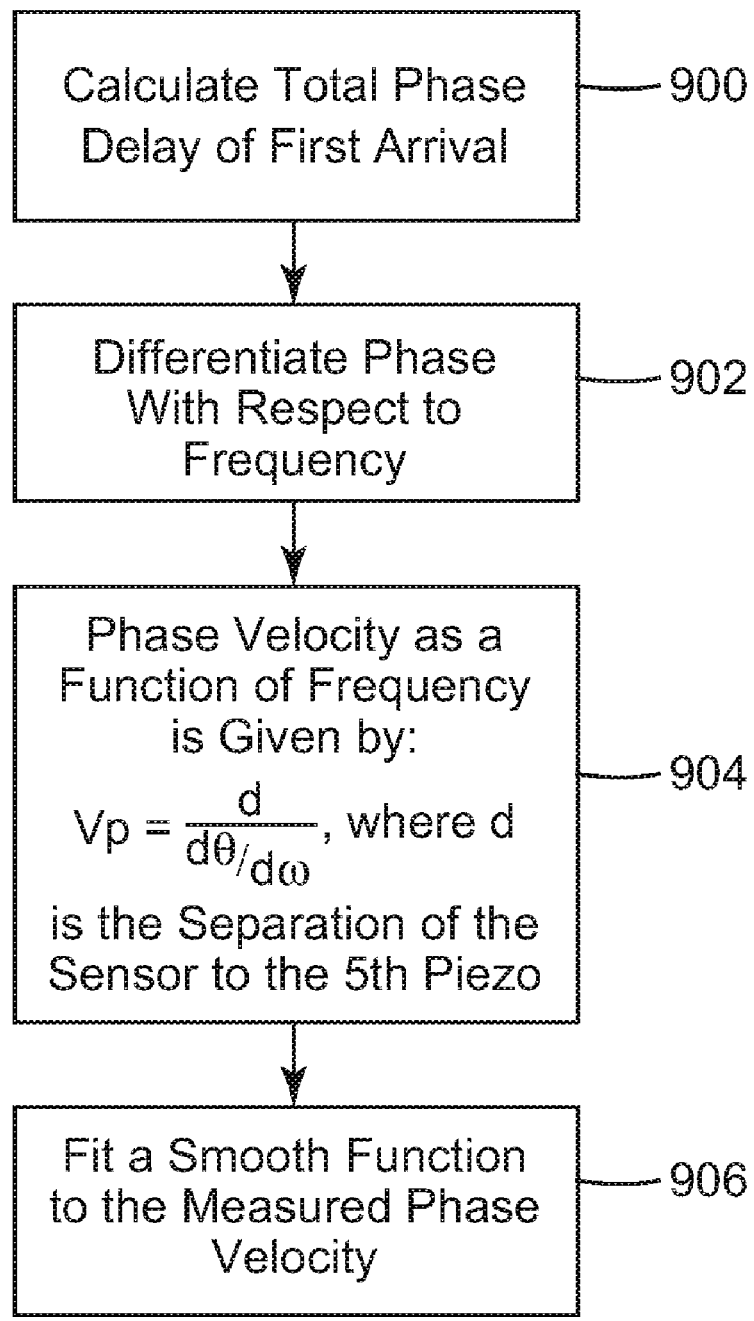
FIG. 19 illustrates a calibration method for determining the material dispersion relation for the touch sensitive plate in accordance with an embodiment of the present invention.

It is understood that the dispersion relation for pure bending motion is a square root dependence on frequency, as discussed above. For any given material, however, there will be a frequency above which the bending deviates from pure bending motion and the square root dependence on frequency is modified. Given a knowledge of the actual dispersion relation, this modification may be incorporated in the dispersion correction transform generally employed in the contact location calculation. One method for measuring the dispersion relation of a given material is shown in FIG. 19. This approach is based on the total phase delay, as previously described with reference to FIG. 17.

As is shown in FIG. 19, the total phase delay of the first arrival energy at each pickup sensor is calculated 900. For each of the pickup sensors, the phase, which may be computed in a manner described with reference to FIG. 17, is differentiated 902 with respect to frequency. The phase velocity, $V_p$, as a function of frequency is given by:

$$v_p = \frac{d}{\frac{d\phi}{d\omega}}$$

where, d is the distance separating a given pickup sensor with the excitation transducer. A smooth function may be fit 906 to the measured phase velocity. This smooth function characterizes the dispersion relation as a function of frequency, and may be used to correct for deviations of the dispersion relation from a square root dependence on frequency.

According to another approach to determining the dispersion relation of a given material, a parametric model for the dispersion relation may be established and used to optimize these parameters. Such an optimization may be based on the application of a dispersion correction and measuring the dispersion corrected impulse response for sharpness of the resulting impulse. The chosen dispersion relation will result in the maximum sharpness of the dispersion corrected impulse.

The methods described above represent various approaches to determining the dispersion relation and the dimensions of a touch sensitive plate. Another calibration technique that may provide for improved performance of touch sensitive devices is to measure the phase response of each pickup sensor. The sensor calibration results may then be used in the location detection algorithm to correct for differences between pickup sensors, which are either caused by manufacturing tolerances or differences in the integration of the touch sensitive plate into a given system application.

Figure 20:
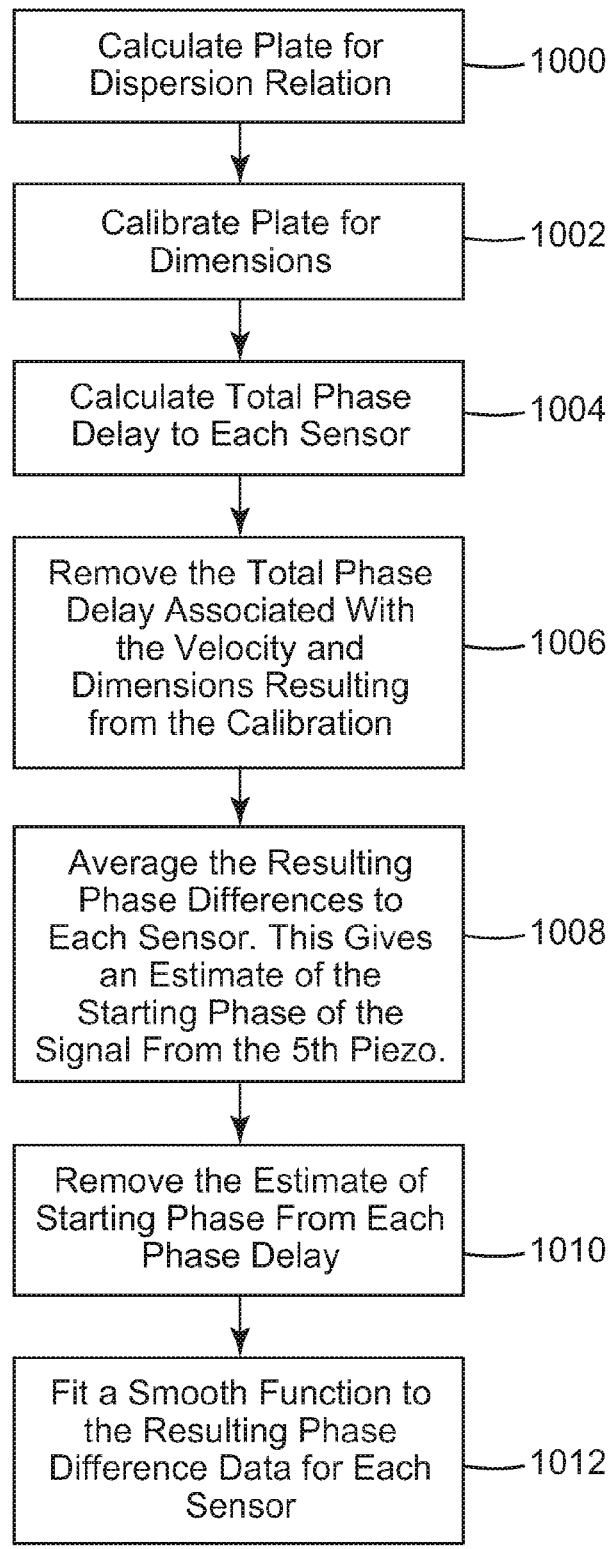
FIG. 20 illustrates a sensor calibration technique for determining the phase response of individual pickup sensors in accordance with an embodiment of the present invention.

In accordance with this calibration methodology, the characteristic of particular interest is the phase response of each pickup sensor, and correction of phase response differences between pickup sensors. One embodiment of a sensor calibration technique according to the present invention is shown in FIG. 20. Using the approaches described above, the dispersion relation is computed 1000 for the subject touch sensitive plate, and the plate dimensions are calculated 1002. The total phase delay to each of the pickup sensors is determined 1004. The total phase delay associated with the velocity and dimensions computed in the calibration processes of blocks 1000 and 1002 is removed 1006. The resulting phase differences to each pickup sensor is averaged 1008, which provides an estimate of the starting phase of the excitation signal emitted by the excitation transducer. This estimate of the starting phase may then be removed 1010 from the phase delay for each of the pickup sensors. A smooth function may be fit 1012 to the resulting phase difference data for each of the pickup sensors. It will be appreciated by those skilled in the art that this technique may be readily extended to a sensor calibration approach based on an amplitude response of each pickup sensor, and correction of amplitude response differences between pickup sensors.

The calibration techniques discussed above have generally been described in the context of a transfer function of the input at the excitation transducer to the output at each of the sensors. An alternative approach involves calculating the correlation function between two pickup sensors in the presence of an excitation signal emitted by the excitation transducer. This alternative method does not require synchronization with the input signal, and a dispersion correction may be applied to the correlation function. Details of a dispersion corrected correlation function that may be employed in a calibration methodology of the present invention are disclosed in one or more of the previously incorporated U.S. patent applications. Implementing the disclosed dispersion corrected correlation function within the context of the methodologies described herein will readily be appreciated by one skilled in the art. In contrast to a transfer function method that returns the direct distance from the excitation transducer to each pickup sensor, a method that uses the dispersion corrected correlation function returns the relative distance of the excitation transducer to each pair of sensing pickup sensors.

The above methods have generally been described in terms of the direct signal emitted by the excitation transducer to each of the pickup sensors. It is understood that reflections from the plate edges and reverberation in the plate contaminate the signal of interest. An extension of the above-described methods is to make use of the reflections in the touch sensitive plate which, if identified correctly, may be used to provide additional information as to the dimensions of the plate.

The touch sensitive plate and sensor calibration methodologies described herein may be employed to enhance performance and diagnostics of a touch sensitive device. For example, plate calibration techniques of the present invention may be used to determine plate size, as discussed previously, and these parameters may be input into the location detection algorithm. Plate calibration may also be used to perform recognition of which touch sensitive plate (e.g., from a database or standard sizes) is attached to the touch panel controller. Based on the return from the plate recognition procedure, parameters for the location detection algorithm may be retrieved from a database. Another enhancement concerns improvement of the parameters in the location detection algorithm to take into account differences between touch sensitive devices either due to manufacturing tolerances or differences in integration.

The methodologies described herein may further be used to track changes in touch sensitive device/system performance over time. Use of the above-described techniques involving a dedicated excitation transducer provides the opportunity to detect both subtle and dramatic changes in the touch sensitive device/system performance over time. By way of example, detecting a large change in a sensor response measurement may be indicative of significant damage sustained by the sensor or touch sensitive plate, such as in the case of plate fracture.

Other changes in touch sensitive device/system characteristics may be reversible, as in the case of a response to the environment, such as temperature dependence. For example, the wave speed in a touch sensitive plate may, for some materials, be overly sensitive to temperature. Extremes of temperature my either speed up or slow down the speed of waves. Calibration of the touch sensitive plate allows such changes to be tracked and corrected for in the location detection algorithm. By way of further example, the foam support for the touch sensitive plate may have a temperature dependence. As discussed previously, the mounting foam may influence the sensor phase response, which may therefore have a temperature dependence.

A repeated calibration of the touch sensitive plate size and sensor phase/amplitude response may characterize and track these changes with temperature. Surface contamination, for example, may change the measured impulse response of the touch sensitive plate, which may be tracked over time. Such contamination may either be localized (e.g., chewing gum) or distributed over a wide area of the touch sensitive plate (e.g., liquid spillage). It is understood that the calibration methodologies described herein may be used to detect, determine, and track a wide array of touch sensitive device/system characteristics and device/system performance over time.

The foregoing description of the various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

The invention claimed is:

1. A touch sensitive apparatus, comprising: a touch plate; a plurality of sensors coupled to the touch plate, each of the sensors configured to sense bending waves in the touch plate;
an excitation transducer coupled to the touch plate and configured to induce bending waves in the touch plate;
a plurality of active buffer circuits, each of the active buffer circuits respectively coupled to one of the sensors, wherein each of the active buffer circuits comprises a field effect transistor; and
a controller coupled to the sensors via the active buffer circuits and to the excitation transducer via a non-actively buffered connection, the controller configured to compute information related to a touch on the touch plate responsive to sense signals received by the sensors.

2. The apparatus of claim 1, wherein the information related to the touch comprises touch location.

3. The apparatus of claim 1, wherein the information related to the touch comprises information concerning detection of a lift-off of the touch.

4. The apparatus of claim 1, wherein:
the touch plate is substantially rectangular;
the plurality of sensors comprises four sensors each positioned at a respective corner of the touch plate; and
the excitation transducer is positioned proximate a peripheral edge of the touch plate.

5. The apparatus of claim 1, wherein the plurality of sensors comprises piezoelectric sensors.

6. The apparatus of claim 5, wherein the excitation transducer comprises a piezoelectric transducer.

7. The apparatus of claim 1, wherein each of the active buffer circuits comprises a field effect transistor.

8. The apparatus of claim 1, wherein the plurality of sensors, the plurality of active buffer circuits, and the excitation transducer are respectively disposed on the touch plate.

9. The apparatus of claim 1, wherein the excitation transducer is configured to induce bending waves in the touch plate and to sense bending waves in the touch plate.

10. The apparatus of claim 1, wherein each of the sensors is configured to provide a differential sense signal to a balanced input of one of the active buffer circuits, and each of the active buffer circuits is coupled to a balanced input of the controller.

11. The apparatus of claim 1, wherein:
the sensors produce bending wave signals responsive to the induced bending waves; and
the controller computes relative dimensions of the touch plate using the bending wave signals.

12. The apparatus of claim 1, wherein:
the sensors produce bending wave signals responsive to the induced bending waves; and
the controller computes absolute dimensions of the touch plate using the bending wave signals.

13. The apparatus of claim 1, wherein:
the sensors produce bending wave signals responsive to the induced bending waves;
the controller computes dimensions of the touch plate using the bending wave signals; and
the controller computes a phase response of each of the sensors using the computed touch plate dimensions, a dispersion relation, and a measured phase response.

14. The apparatus of claim 1, wherein the excitation transducer induces bending waves in the touch plate in response to a non-audible tone signal.

15. The apparatus of claim 1, wherein the controller comprises an analog-to-digital converter (ADC) having a sampling frequency, the controller generating a tone signal having a frequency substantially equal to that of the sampling frequency of the ADC and communicating the generated tone signal to the excitation transducer.

16. The apparatus of claim 1, wherein the excitation transducer induces bending waves in the touch plate in response to a non-audible multiple tone signal.

17. The apparatus of claim 16, wherein the multiple tone signal comprises tones having frequencies that are spatially non-periodic.

18. The apparatus of claim 1, wherein the excitation transducer induces a non-audible broadband noise stimulus in the touch plate.

19. The apparatus of claim 1, wherein the excitation transducer induces bending waves in the touch plate in response to receiving a swept tone signal from the controller, the sensors producing bending wave signals responsive to the induced bending waves.

20. The apparatus of claim 19, wherein the controller comprises a demodulator that demodulates the bending wave signals synchronously with respect to the swept tone signal.

21. The apparatus of claim 1, wherein:
the controller comprises an analog-to-digital converter (ADC) having a sampling frequency, $f_s$; and
the excitation transducer induces bending waves in the touch plate having frequencies greater than $f_s/2$.

22. The apparatus of claim 21, wherein:
the sensors produce bending wave signals responsive to the induced bending waves having frequencies greater than $f_s/2$; and
the ADC registers the bending wave signals as aliased bending wave signals having frequencies lower than $f_s/2$.

23. The apparatus of claim 1, wherein:
the controller comprises an analog-to-digital converter (ADC) having a sampling frequency, $f_s$; and
the excitation transducer induces bending waves in the touch plate having a frequency substantially equal to $f_s$.

24. The apparatus of claim 23, wherein:
the sensors produce bending wave signals responsive to the induced bending waves; and
the ADC registers the bending wave signals as aliased bending wave signals having a dc offset determined by an amplitude and a phase of the induced bending waves.

25. The apparatus of claim 1, wherein:
the excitation transducer is configured to induce bending waves in the touch plate and to sense bending waves in the touch plate; and
the controller further comprises wake-up circuitry coupled to the excitation transducer, the wake-up circuitry configured to generate a wake-up signal in response to the excitation transducer sensing a touch to the touch plate and to communicate the wake-up signal to the controller.

26. The apparatus of claim 25, wherein at least the active buffer circuits transition from a sleep mode to an operating mode responsive to the controller receiving the wake-up signal.

27. The apparatus of claim 1, further comprising a display coupled to the touch sensitive apparatus.

28. The apparatus of claim 1, further comprising:
a display coupled to the touch sensitive apparatus; and
a host processor coupled to the display and the touch sensitive apparatus.

\* \* \* \* \*

UNITED STATES PATENT AND TRADEMARK OFFICE
CERTIFICATE OF CORRECTION

PATENT NO.         : 7,411,584 B2                                  Page 1 of 1
APPLICATION NO.    : 10/750502
DATED              : August 12, 2008
INVENTOR(S)        : Nicholas P. R. Hill It is certified that error appears in the above-identified patent and that said Letters Patent is hereby corrected as shown below:

Drawings

In the drawings, Sheet 2, Fig. 1C, delete "non-dispersive response (arb units)", and insert -- non-dispersive response (arb units) -- therefor.

In the drawings, Sheet 7, Fig. 8, delete "Tranducer 1" and insert -- Transducer 1 -- therefor.

In the drawings, Sheet 7, Fig. 8, delete "Tranducer 2" and insert -- Transducer 2 -- therefor.

In the drawings, Sheet 7, Fig. 8, delete "Tranducer N" and insert -- Transducer N -- therefor.

In the drawings, Sheet 10, Fig. 11, delete "Tranducer" and insert -- Transducer -- therefor.

In the drawings, Sheet 11, Fig. 12, delete "Tranducer" and insert -- Transducer -- therefor.

Signed and Sealed this

Second Day of December, 2008

JON W. DUDAS
*Director of the United States Patent and Trademark Office*